(12) United States Patent
Viele et al.

(10) Patent No.: US 6,786,200 B2
(45) Date of Patent: Sep. 7, 2004

(54) METHOD AND APPARATUS FOR CONTROLLING COMBUSTION QUALITY IN LEAN BURN RECIPROCATING ENGINES

(75) Inventors: Matthew Viele, Fort Collins, CO (US); Luigi P. Tozzi, Fort Collins, CO (US); Ed VanDyne, Framingham, MA (US)

(73) Assignee: Woodware Governor Company, Fort Collins, CO (US)

( * ) Notice: Subject to any disclaimer, the term of this patent is extended or adjusted under 35 U.S.C. 154(b) by 0 days.

(21) Appl. No.: 10/691,155

(22) Filed: Oct. 22, 2003

(65) Prior Publication Data

US 2004/0094124 A1 May 20, 2004

Related U.S. Application Data

(60) Provisional application No. 60/426,770, filed on Nov. 15, 2002.

(51) Int. Cl.⁷ .................................................. F02P 5/00
(52) U.S. Cl. .............................. 123/406.27; 123/406.12
(58) Field of Search ....................... 123/406.12, 406.27, 123/406.26, 406.28, 406.29, 536

(56) References Cited

U.S. PATENT DOCUMENTS

| | | | |
|---|---|---|---|
| 5,769,049 A | 6/1998 | Nytomt et al. | |
| 5,777,216 A | 7/1998 | Van Duyne et al. | |
| 5,778,855 A | * 7/1998 | Czekala et al. | 123/406.27 |
| 5,803,047 A | 9/1998 | Rask | |
| 5,925,819 A | 7/1999 | Yoshinaga et al. | |
| 5,992,386 A | * 11/1999 | Nytomt et al. | 123/406.37 |
| 6,029,627 A | 2/2000 | VanDyne | |
| 6,105,552 A | 8/2000 | Arisawa et al. | |
| 6,474,302 B2 | 11/2002 | Takahashi et al. | |
| 6,550,312 B1 | 4/2003 | Hohner et al. | |
| 6,561,163 B1 | 5/2003 | Takahashi et al. | |

\* cited by examiner

*Primary Examiner*—Bibhu Mohanty
(74) *Attorney, Agent, or Firm*—Leydig, Voit & Mayer, Ltd.

(57) ABSTRACT

An apparatus and method to detect and control the combustion quality of a lean burn reciprocating engine using ionization signals is presented. The system receives a succession of ionization signals for successive cycles of a running engine and processes a plurality of related ionization signals for signal stability. A start point and peak of the ionization signal is identified, using an initial current level for all of the signals. A geometric parameter is associated with the ionization signal that relates the start point to the peak. The geometric parameter is compared against a reference geometric parameter related to a desired combustion quality relating to a lambda greater than 1.4. A control parameter of the engine is adjusted such that an error difference between the geometric parameter and the reference geometric parameter is minimized. The ionization signals are checked to determine if an abnormal combustion condition such as knock or misfire has occurred.

48 Claims, 16 Drawing Sheets

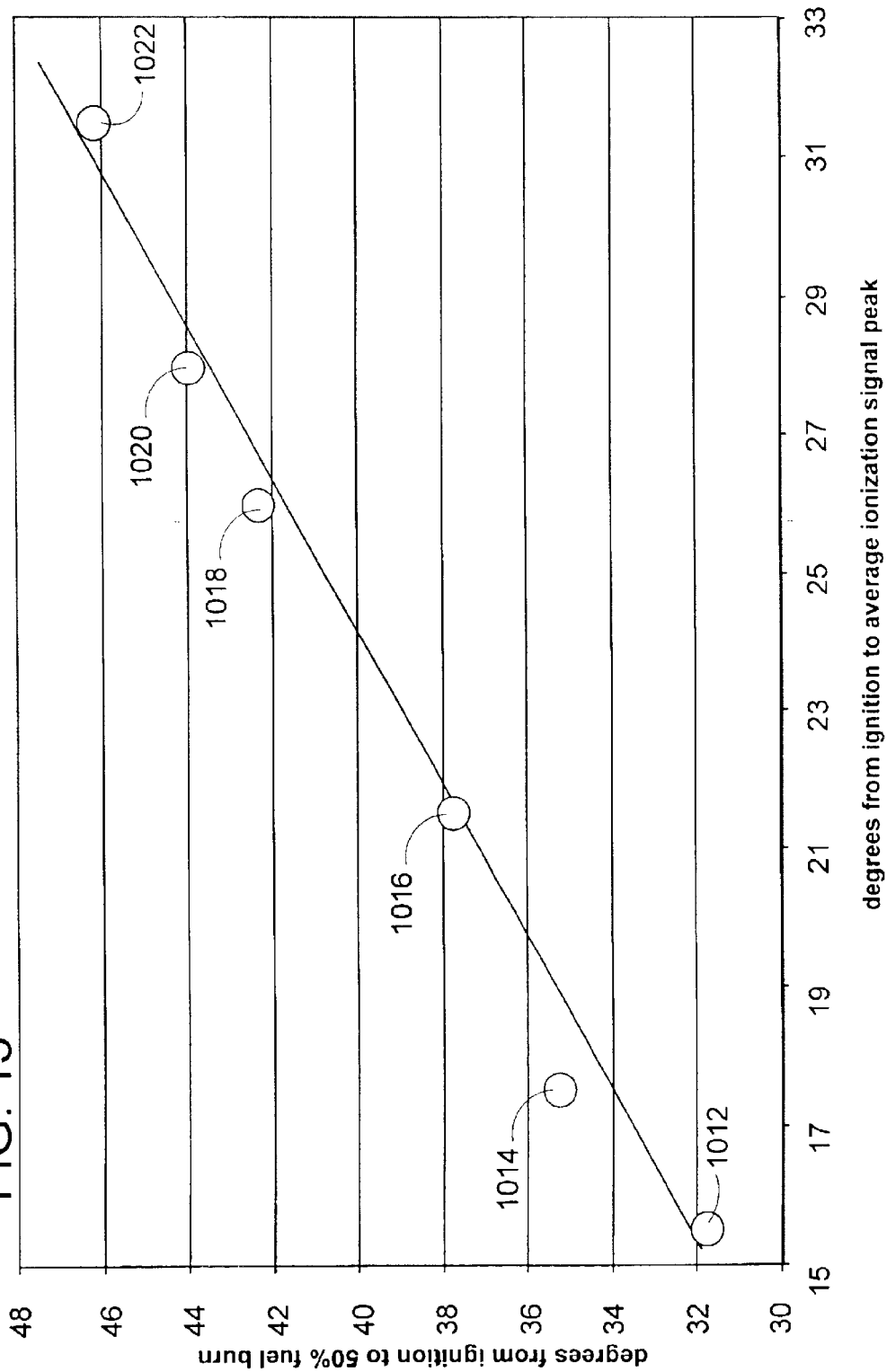

METHOD AND APPARATUS FOR CONTROLLING COMBUSTION QUALITY IN LEAN BURN RECIPROCATING ENGINES

CROSS-REFERENCE TO RELATED PATENT APPLICATIONS

This patent application claims the benefit of U.S. Provisional Patent Application No. 60/426,770, filed Nov. 15, 2002.

FIELD OF THE INVENTION

The present invention relates generally to ignition systems in spark ignited engines, and more particularly relates to such systems in lean burn engines in which the excess air factor $\lambda$ is greater than 1.4.

BACKGROUND OF THE INVENTION

Industry has developed various techniques using ionization signals for detecting abnormal combustion conditions such as misfire, knock, and approximate air/fuel ratio for stoichiometric engines. Free ions present in the combustion gases are electrically conductive and are measurable by applying a voltage across an ionization probe. Alternatively, the voltage is applied across the electrodes of a spark plug after the spark plug has ignited the combustion mixture. The applied voltage induces a current in the ionized gases that is measured in order to provide an ionization signal at a magnitude that is readable by a controller such as a microprocessor. The ionization signal is used in the control of the engine. For example, in U.S. Pat. No. 6,029,627, ionization signals and a single $O_2$ sensor in the exhaust are used to control the air/fuel ratio in engines to achieve stoichiometric operation. This technique uses the $O_2$ sensor to achieve stoichiometry of the overall mixture of the engine and then equalizes the amplitude or location of the first local peak of the ionization signal in each individual cylinder. Another technique disclosed in U.S. Pat. No. 5,992,386 performs a frequency analysis of the ionization signal to detect abnormal combustion conditions such as knock. These systems integrate the ionization signal and compare the magnitude of the integrated signal to the magnitude of the integrated signal of a normal combustion event. The abnormal combustion condition is detected if the magnitude of the integrated signal is above a threshold level, which is set above the magnitude of the integrated signal of a normal combustion event.

One of the drawbacks of stoichiometric engines is the emission of pollutants. With fixed engine timing and load, the $NO_x$ emissions level of a typical gas engine is dependent upon the air/fuel ratio. Near a chemically correct (i.e., stoichiometric) ratio, the $NO_x$ emissions peak and then drop significantly as the amount of excess air is increased. Maintaining a stable combustion process with a high air/fuel ratio is difficult to manage. As a result, conventional spark-ignited gas engines typically operate near the stoichiometric air/fuel ratio and depend upon exhaust after treatment with catalytic converters to reduce the $NO_x$ emissions.

Government agencies and industry standard setting groups are reducing the amount of allowed emissions in an effort to reduce pollutants. As a result, industry is moving towards using lean burning engines to reduce emissions despite the difficulty of maintaining a stable combustion process in lean burning engines. By using more air during combustion, turbocharged lean-burn engines can enhance fuel efficiency without sacrificing power and produce less nitrous oxide pollutants than conventional stoichiometric engines.

Ionization sensing has not been utilized to any significant extent in these lean burn engines. Because of the lean nature of the mixture, the ionized species concentration, including $NO_x$, is much less than at stoichiometric conditions. As a result, the ionization signal is of very low intensity and has great variability. The techniques developed using ionization signals for stoichiometric operation are unsuitable for lean burn operation and do not work. For example, the ionization signals of some lean burn engines are sufficiently variable and are low enough in magnitude that integrating the signal cannot be done reliably due to a number of factors. These factors include higher levels of noise relative to the ionization signal magnitude, the variability of the ionization signal, and the low magnitudes of the overall signal and the resultant integrated signal.

BRIEF SUMMARY OF THE INVENTION

In view of the foregoing, an object of the present invention is to provide a system and method to monitor and control the combustion quality of a lean burn engine using ionization signals.

The foregoing objects are among those attained by the invention, which provides a system and method to monitor the combustion quality of a lean burn reciprocating engine and includes an ionization module for measuring a succession of ionization signals of the lean burn reciprocating engine for successive cycles of a running engine and processing a plurality of related ionization signals for signal stability, identifying, using an initial current level for all of the signals, a start point of the ionization signal and a peak for the resultant ionization signal, associating a geometric parameter with the resultant ionization signal which relates the start point of the ionization signal to the peak for the resultant ionization signal, and compares the geometric parameter against a reference geometric parameter related to a desired combustion quality relating to $\lambda$ greater than 1.4. It also includes an air/fuel module in communication with the ionization module. The air/fuel module adjusts a control parameter of the lean burn reciprocating engine such that an error difference between the geometric parameter and the reference geometric parameter is minimized.

In another embodiment, the ionization module is coupled to each of the plurality of cylinders. The air/fuel ratio module adjusts a control parameter of the lean burn reciprocating engine for each cylinder independently based upon the geometric parameter corresponding to the respective cylinder.

A method for analyzing and controlling the combustion quality in a lean burn reciprocating engine is also disclosed. The method includes receiving a succession of ionization signals of the lean burn reciprocating engine for successive cycles of a running engine and processing a plurality of related ionization signals for signal stability. The method includes the steps of identifying, using an initial current level for all of the signals, a start point of the ionization signal and a peak for the ionization signal, associating a geometric parameter with the ionization signal which relates the start point of the ionization signal to the peak for the ionization signal; comparing the geometric parameter against a reference geometric parameter related to a combustion quality in lean burn engines operating with a $\lambda$ greater than 1.4, and outputting an indication of the combustion quality. The indication of the combustion quality is used to adjust a control parameter of the engine such that an error difference between the geometric parameter and the reference geometric parameter is minimized.

The geometric parameter in one embodiment is a slope of a line from the starting point of the resultant ionization signal and passing through the peak of the resultant ionization signal. Alternatively, the geometric parameter is an aspect ratio of a box having a lower left corner at the starting point of a resultant ionization signal, a top at the peak of the resultant ionization signal, and a right side at a percentage of the peak of the resultant ionization signal.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1b is a block diagram of the ionization module of FIG. 1a;

FIG. 4b is a graphical representation of pressure and ionization current versus engine piston crank angle for an incipient knock event of the spark plug design of FIG. 4a;

FIG. 4c is a graphical representation of pressure and ionization current versus engine piston crank angle for a severe knock event of the spark plug design of FIG. 4a;

FIG. 5b is a graphical representation of pressure and ionization current versus engine piston crank angle for an incipient knock event of the spark plug design of FIG. 5a;

FIG. 5c is a graphical representation of pressure and ionization current versus engine piston crank angle for a severe knock event of the spark plug design of FIG. 5a;

FIG. 15 is a graph illustrating a burn rate relationship between a 50% fuel burn location and an average ionization signal peak location in a typical natural gas power generation engine operating with air/fuel ratios corresponding to an excess-air factor lambda in the range of 1.6 to 1.85.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention provides an apparatus and method to monitor and adjust the combustion quality in a lean burn reciprocating engine using ionization signals. As used herein, a lean burn reciprocating engine is a reciprocating engine operating with an air/fuel ratio corresponding to an excess-air factor lambda ($\lambda$) greater than 1.4, typically in the range of 1.4 to 1.85, and preferably in the range of 1.67 to 1.82. The excess-air factor is related to the air-fuel ratio according to the equation $$\lambda = \frac{\text{Actual air/fuel ratio}}{\text{Stochiometric air/fuel ratio}}$$

The excess-air factor $\lambda$ indicates the amount that the air/fuel ratio is above or below a stoichiometric mixture. For example, λ=1.4 corresponds to an air/fuel ratio that is 140% of stoichiometric.

Figure 1A:
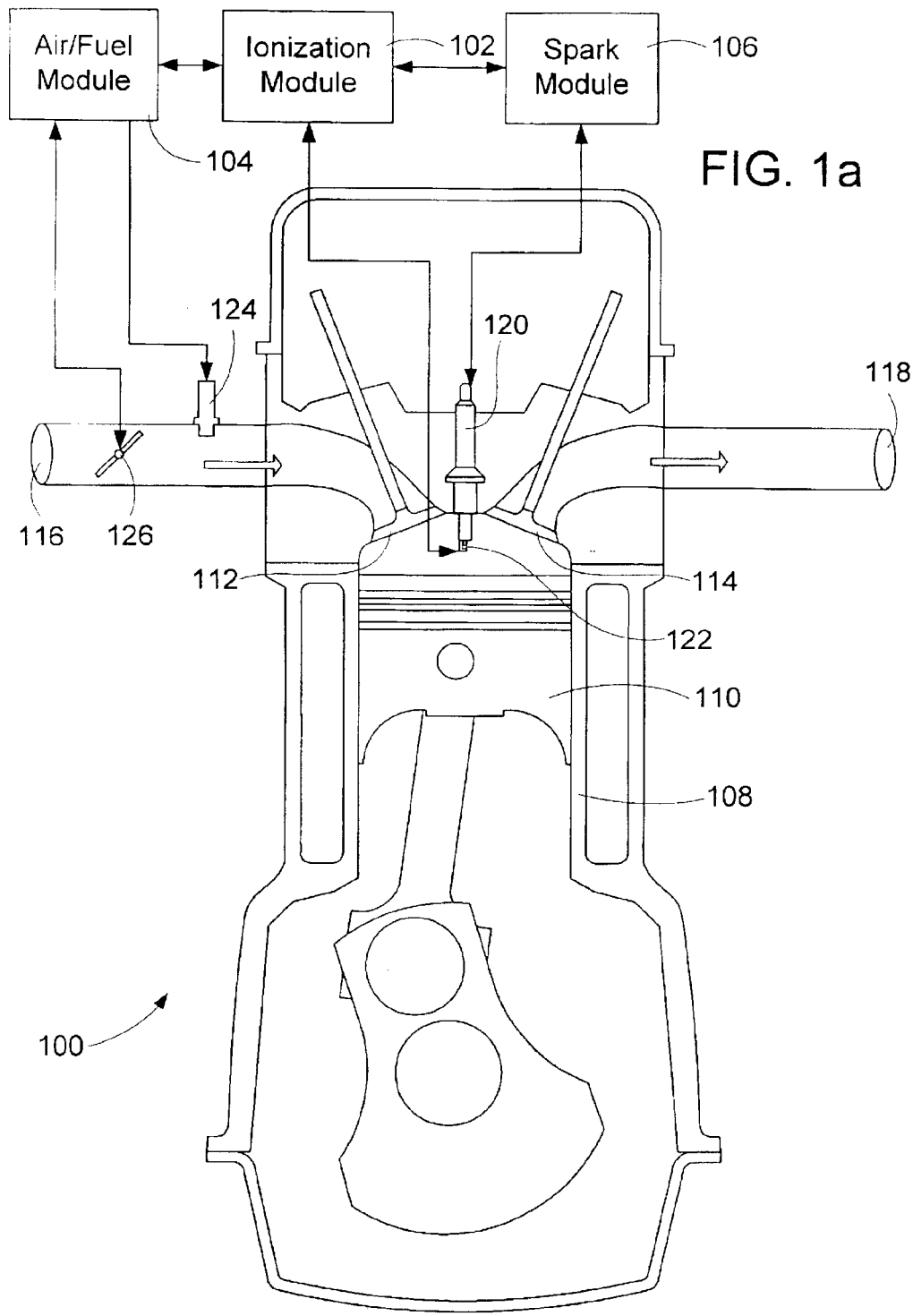
FIG. 1a is a schematic view of a combustion quality control of the present invention.

Referring initially to FIG. 1a, a system 100 exemplifying the present invention is shown. The system includes an ionization module 102, an air/fuel module 104, a spark module 106, and a reciprocating engine. While the ionization module 102, the air/fuel module 104 and the spark module 106 are shown separately, it is recognized that the modules 102, 104, 106 may be combined into a single module or be part of an engine controller having other inputs and outputs. The reciprocating engine includes engine cylinder 108, a piston 110, an intake valve 112 and an exhaust valve 114. An intake manifold 116 is in communication with the cylinder 108 through the intake valve 112. An exhaust manifold 118 receives exhaust gases from the cylinder 108 via the exhaust valve 114. The intake valve 112 and exhaust valve 114 may be electronically, mechanically, hydraulically, or pneumatically controlled or controlled via a camshaft. A spark plug 120 with a spark gap 122 ignites the air/fuel mixture in cylinder 108. Spark module 106 controls ignition timing and provides power to the spark plug 120.

Figure 1B:
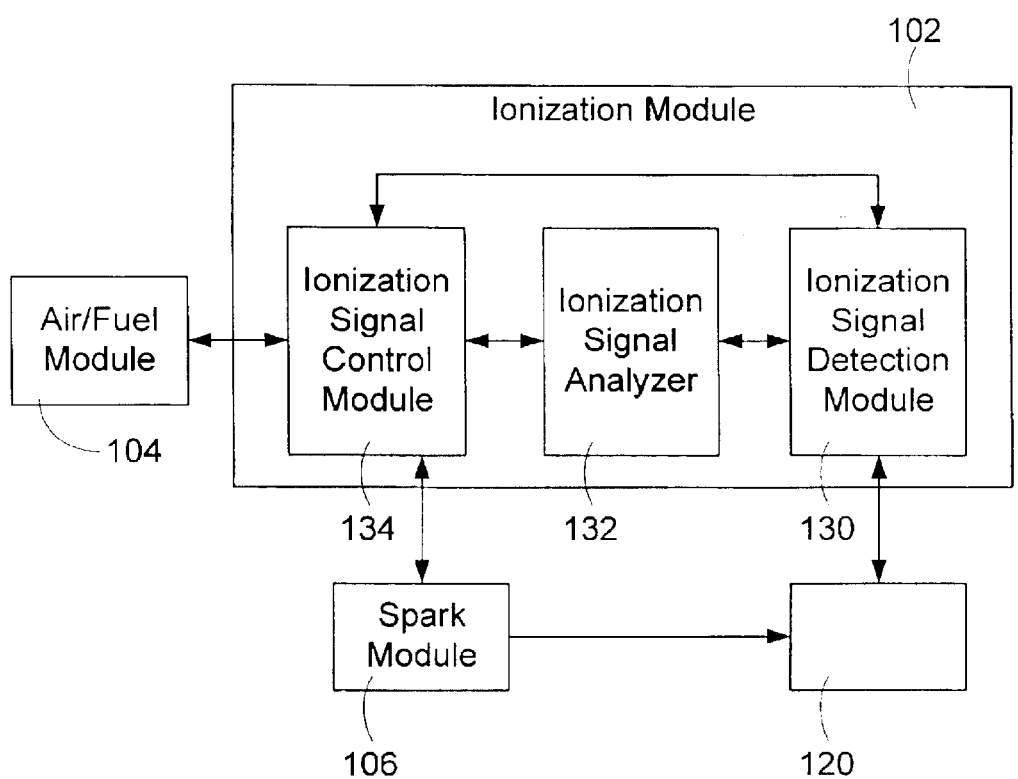

The ionization module contains circuitry for detecting and analyzing the ionization signal. In the illustrated embodiment, as shown in FIG. 1b, the ionization module includes an ionization signal detection module 130, an ionization signal analyzer 132, and an ionization signal control module 134. In order to detect abnormal combustion conditions and determine the air/fuel ratio, the ionization module 102 supplies power to the spark gap 120 after the air and fuel mixture is ignited and measures ionization signals from the spark gap 120 via ionization signal detection module 130. Alternatively a conventional ionization probe or other conventional device to detect ionization may be used to measure the ionization signals. Ionization signal analyzer 132 receives the ionization signal from ionization signal detection module 130 and determines if an abnormal combustion condition exists and monitors and adjusts the combustion quality as described herein. The ionization signal control module 134 controls ionization signal analyzer 132 and ionization signal detection module 130. The ionization signal control module 134 provides an indication to the air/fuel module of the abnormal combustion condition as described below. In one embodiment, the ionization module 102 sends the indication to other modules in the engine system such as an engine controller. While the ionization signal detection module 130, the ionization signal analyzer 132, and the ionization signal control module 134 are shown separately, it is recognized that they may be combined into a single module and/or be part of an engine controller having other inputs and outputs.

Returning now to FIG. 1a, the air/fuel module 104 controls fuel injection 122 and may control throttle valve 124 to deliver air and fuel, at a desired ratio, to the engine cylinder 106. The air/fuel module 104 receives feedback from the ionization module and adjusts the air/fuel ratio as described below.

The ionization signal is proportional to the air/fuel ratio of the fuel mixture. The air/fuel ratio of the mixture is higher in lean burn engines (i.e., the amount of fuel is lower) than in stoichiometric engines. The lower amount of fuel relative to air results in a lower flame temperature, which translates into a lower number of free ions present in the combustion gases. In addition, the spark plug design in conjunction with the gasdynamic and thermodynamic characteristics of the combustion event greatly affects the magnitude and repeatability of ion signal. For example, systems having spark plugs having a high electrode surface area and electrodes that are mostly shielded from the combustion chamber airflow provide higher magnitude and more consistent ionization signals than other types of spark plugs. On the other hand, the ionization signal is not easy to detect or process in lean burn engines using conventional "J-gap" automotive type spark plugs because the signal is of very low intensity and has great variability. Prior art systems that use the energy delivered to ignite the fuel mixture to detect the ionization signal will not work properly because these system will get a weak signal or no signal at all. The preferred form of the present invention supplies power to the spark gap after the air and fuel is ignited to measure ionization signals. Additional free ions flow when the additional power is applied, thereby resulting in an ionization signal that is easier to detect.

The ionization signal is acquired with respect to an engine parameter over the combustion cycle. For example, the engine parameter may be crank angle, time after ignition, time from top dead center, etc. Abnormal combustion conditions such as misfire and knock are detected at specific points in the combustion cycle. These points are where the ionization signal of the abnormal combustion condition has a signal characteristic that is different from ionization signals of normal combustion conditions. For example, misfire occurs when the ionization signal remains at or near an initial value for an extended interval of the combustion cycle. A misfire condition is often due to an inadequate air/fuel ratio (e.g., too lean), spark timing, and/or spark characteristics.

In order to detect abnormal combustion events in a lean burn engine, a floating bounded space is associated with the ionization signal (measured with respect to a combustion event) to detect the abnormal combustion conditions. The floating bounded space is a space that is located at a position in the combustion cycle and sized such that a portion of the ionization signal will reliably be within the space during the abnormal combustion condition and reliably be outside the space during normal combustion conditions. The position of the floating bounded space is a function of an engine timing parameter (e.g., crank angle, time, etc.) and the size is a function of the engine timing parameter and ionization signal magnitude. For example, a floating bounded space shaped as a box has one axis (e.g., length) of the box in units of the engine parameter (e.g., crank angle) and the other axis (e.g., height) of the box in units of ionization signal magnitude. Preferably, a floating bounded space is used for each abnormal combustion condition (e.g., a floating bounded space for misfire, a floating bounded space for incipient knock, a floating bounded space for severe knock, etc.).

When the ionization signal reaches the point in the combustion cycle where the floating bounded space has been positioned, the ionization signal magnitude is compared to the magnitude range of the floating bounded space. The ionization module 102 indicates that an abnormal combustion condition has occurred if the ionization signal is within the floating bounded space according to criteria described below. Use of the floating bounded space according to the invention overcomes the problems associated with prior art integrating techniques. The effect of noise is reduced by eliminating the integration of the ionization signal. Integration is implicitly a filtering operation that can miss short bursts of activity that are indicative of combustion conditions. In lean burn combustion these short bursts may be the only difference between a normal combustion condition and an abnormal combustion condition. The floating bounded space detects the short bursts. The variability in the ionization signal is accounted for during a calibration process when the floating bounded space is sized and positioned as described herein.

Signal characteristics of the ionization signal are used to characterize each abnormal combustion condition and to determine at what point in the combustion cycle that the abnormal combustion condition can be reliably detected. The floating bounded space is derived to capture the signal characteristic of the ionization signal indicative of the abnormal combustion condition and is associated with the ionization signal. In the description that follows, the details of determining the starting position and the size of the floating bounded space will be discussed and then the details of detecting an abnormal combustion condition will be described. A floating box shall be used to describe positioning and sizing the floating bounded space. The ionization signal will be acquired with respect to crank angle. It is recognized that any shape may be used for the floating bounded space and the ionization signal can be acquired with respect to time or other engine parameters.

Figure 2:
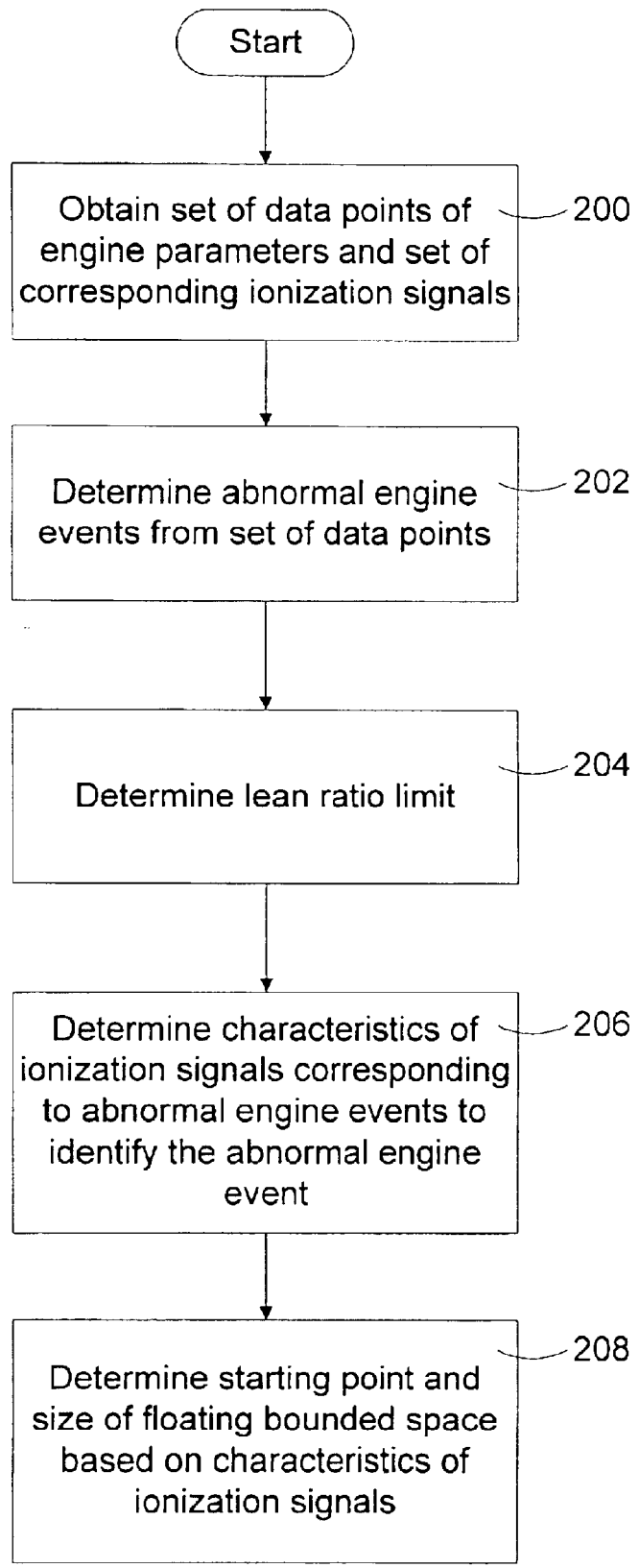
FIG. 2 is a flow chart illustrating the steps to characterize an engine and determine parameters of a floating bounded space in accordance with the teachings of the invention.

Turning now to FIG. 2, the overall steps of the tuning process are shown. The tuning process determines the starting position and the size of the floating bounded space. The process also determines an air/fuel ratio lean limit for a given spark characteristic and spark timing at which the engine has a high likelihood of misfire if the engine is operating with an air/fuel ratio above the lean limit. As the air/fuel ratio becomes leaner, the probability of misfire increases. The lean limit is set based upon operating constraints. For example, an engine may be allowed to misfire a percentage of the number of cycles during operation while another engine may never be allowed to misfire. The limit is set to a richer air/fuel ratio if the engine is not allowed to misfire that is more than the air/fuel ratio of an engine that is allowed to misfire during operation. Although air/fuel ratio and spark timing are key control parameters, it is recognized that other engine parameters can be used to control an engine (e.g., percent EGR, waste gate and throttle position, etc.). A set of data points of engine parameters that can be used to determine the abnormal combustion condition and a set of corresponding ionization signals at various operating conditions of the lean burn engine is obtained (step 200). The set of data points of engine parameters may be indicated mean effective pressure (IMEP) of the cylinder, air/fuel ratio, or any other engine parameter that can be used to determine when the abnormal combustion condition has occurred. A test engine is typically used to obtain the set of data points and learn the characteristics of the engine during normal and abnormal operating conditions. The use of a test engine allows sensors and diagnostic equipment to be used that are typically not available in production engines. For example, the IMEP of a cylinder is generally not acquirable in production engines from cylinder pressure sensors because production engines generally do not have pressure sensors in each cylinder due to cost and reliability issues. In some lean burn systems, the ionization signal may be noisy. In these systems, the set of corresponding ionization signals are acquired using filters to filter the ionization signal. For example, a moving average filter can be used where the number of data points to average is defined based upon signal characteristics of the ionization signal.

The abnormal combustion condition is determined from the set of data points (step 202). For example, a misfire can be detected using the IMEP of a cylinder. A misfire occurs if the IMEP is below a defined threshold. In one embodiment this threshold is a predetermined percentage of the nominal value of IMEP for the cylinder. The ionization signals corresponding to the abnormal combustion condition are compared to the ionization signals of normal combustion conditions to determine characteristics of the ionization signal that can be used to identify the abnormal event (step 204). The starting point and size of the floating box is then determined using the characteristics of the ionization signals (step 206). In one embodiment, the starting point and size of the floating box is determined by looking at the abnormal combustion conditions and determining the upper and lower extremes in the data set. The floating box is sized and positioned at one extreme and then the floating box is tuned at the other extreme. The floating box is preferably sized and positioned with sets of data points acquired at different operating conditions. The floating box parameters (i.e., size and position) may vary with engine operating conditions, such as speed, engine load, and desired air/fuel ratio. For example, the size of the floating box is different at engine idle and full power.

Figure 3A:
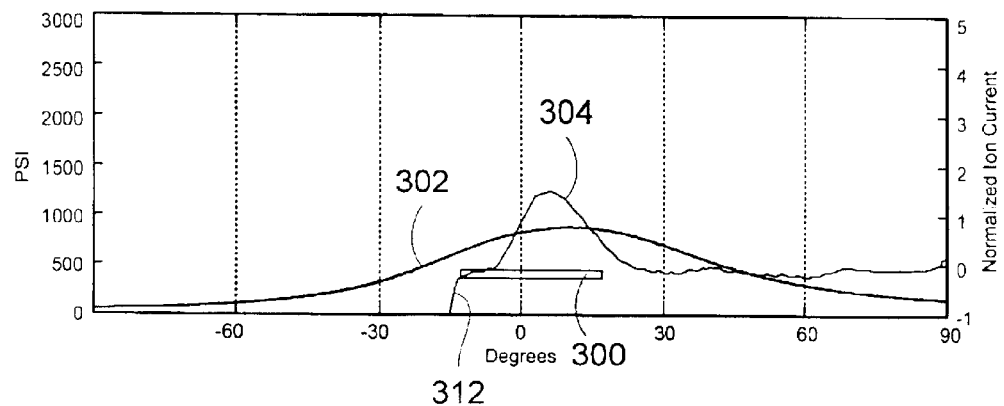
FIG. 3a is a graphical representation of pressure and ionization current versus engine piston crank angle for a normal combustion event.
Figure 3B:
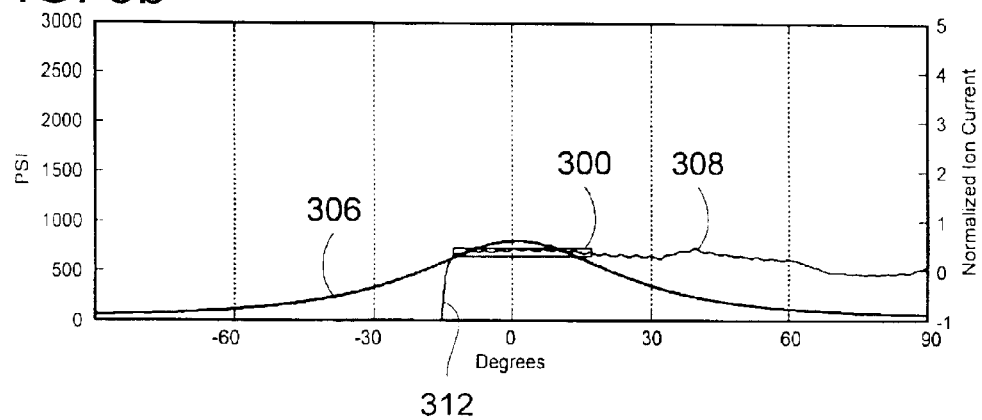
FIG. 3b is a graphical representation of pressure and ionization current versus engine piston crank angle for a misfire event.
Figure 3C:
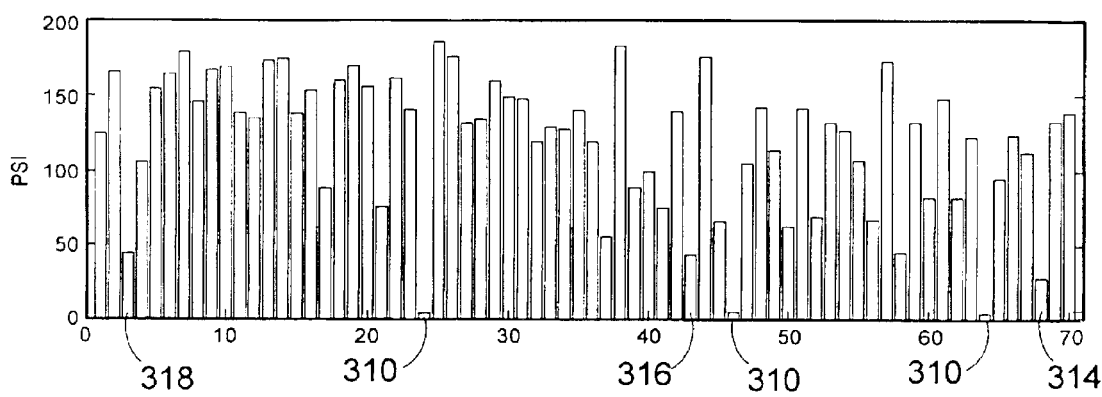
FIG. 3c is a graphical illustration of experimental data showing a correlation between indicated mean effective pressure of an engine cylinder and misfire that is used in sizing the floating bounded space of the present invention.

Turning now to FIGS. 3a–3c, the floating box 300 for a misfire event is shown. FIG. 3a is an illustration of a representative cylinder pressure 302 and ionization signal 304 of a normal combustion condition. FIG. 3b is an illustration of a representative cylinder pressure 306 and ionization signal 308 for a misfire condition. A representative set of data points of the engine parameter for 70 engine cycles is shown in FIG. 3c. The engine parameter used is the IMEP of a cylinder. If the IMEP of any data point is below a selected amount, the data point is classified as a misfire condition. The selected amount should be set to a point that detects all the misfires. In one embodiment, the selected amount is a predetermined percentage of nominal. Data points 310 in FIG. 3c correspond to a misfire condition. It can be seen that the ionization signal 304 of a normal combustion condition has an initial short flattened portion from the initial starting point followed by a peaked portion. In contrast, the misfire condition remains substantially constant for a given duration. One characteristic of a misfire condition in the ionization signal for many engines is that a portion of the ionization signal remains substantially constant from the initial starting point 312 of the ionization signal for an extended interval as can be seen in FIG. 3b and can be confined within a bounded space. It is recognized that other characteristics may be used.

The tuning process is used to determine the starting point and size of the floating box using the characteristics of the ionization signals. The tuning process adjusts the size and position of the floating box to reliably capture the misfire condition and exclude the normal combustion condition. The staring point and size of the floating box is adjusted until the floating box is of sufficient size and at a location of the ionization signal with respect to crank angle such that a portion of the ionization signal of a misfire condition reliably remains within the floating box 300 for the duration of the floating box 300 as shown in FIG. 3b and leaves the floating box 300 for a normal combustion condition as shown in FIG. 3a. This is accomplished by overlaying the floating box on the ionization signals corresponding to the normal and abnormal combustion cycles shown in FIG. 3c and adjusting the box parameters (e.g., starting point (with respect to crank angle (i.e., time) and ionization signal magnitude), duration, and height) to optimize the box. For example, the floating box is superimposed on ionization signals corresponding to the upper and lower extremes of data points 310 (i.e., the misfire conditions) in the engine being characterized and the box parameters are adjusted such that the portion of the ionization signal reliably remains within the box for each condition. The floating box is then superimposed on the ionization signal for the normal ionization signals that are closest in form to the ionization signals for misfire conditions. For example, the ionization signals corresponding to data points 312, 314, and 316 are likely to be closest in shape or form to ionization signals corresponding to misfire conditions. The floating box is then adjusted until the portion of the ionization signal of the normal combustion condition is not captured by the floating box. This process is repeated for all of the ionization signals in the data set for the various engine operating conditions (e.g., speed, engine load, desired air/fuel ratio, etc.) to ensure that the floating box reliably captures misfire conditions and excludes other conditions. The box parameters are then used during engine operation to detect misfire conditions.

During operation, the ionization signal analyzer 132 receives the ionization signal. It floats the floating box over the ionization signal in accordance with the box parameters. In one embodiment, the lowest magnitude of the ionization signal is determined beginning at the starting point of the floating box and ending at the boundary of the floating box (i.e., for the duration of the floating box). For example, if the duration of the floating box is thirty degrees of crank angle, the lowest magnitude of the ionization signal is determined over the thirty degrees of crank angle. The starting point of the floating box is then positioned at the starting point crank angle (i.e., time after ignition) at the lowest magnitude of the ionization signal. The ionization signal analyzer 132 then determines if the ionization signal remains within the floating box over the duration of the floating box. The ionization signal analyzer 132 provides an indication to the ionization signal control module 134 that a misfire has been detected if the ionization signal remains within the floating box over the duration of the floating box. FIG. 3b illustrates the ionization signal remaining within the floating box over the duration of the floating box.

The ionization signal control module 134 provides an indication to the air/fuel module 104 and spark module 106 of the misfire condition and to other modules such as the engine controller. The air/fuel module 104 and spark module 106 (or the engine controller), in turn, determine what action to take. The actions that can be taken include advancing the ignition timing and/or running the engine richer (e.g., adding more fuel to the air/fuel mixture) or doing nothing until a predetermined number of misfires have occurred and then advancing the ignition timing and/or running the engine richer. The air/fuel module 104 controls fuel injection 124 and/or throttle valve 126 and spark module 106 controls the spark timing to move the engine away from the misfire condition in accordance with the action decided to be taken (e.g., advancing the ignition timing and/or running the engine richer).

Figure 4A:
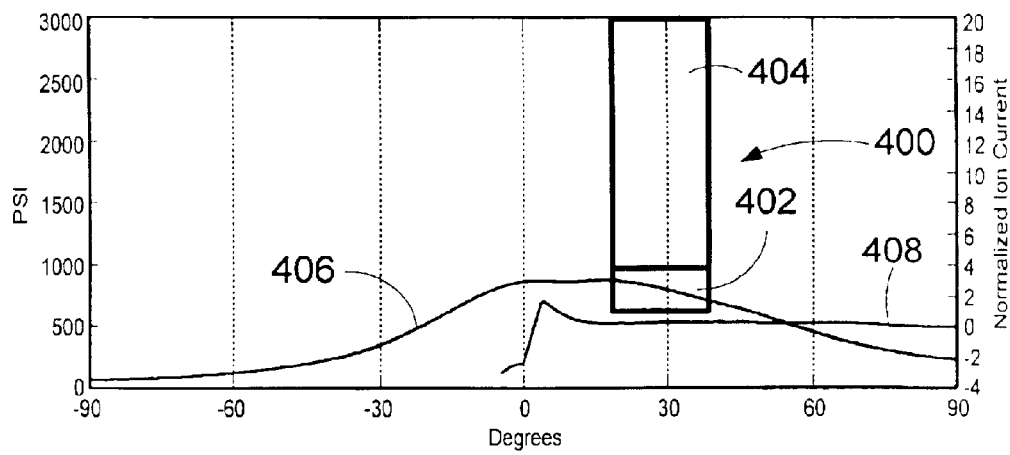
FIG. 4a is a graphical representation of pressure and ionization current versus engine piston crank angle for a normal combustion event of a spark plug design having a high electrode surface area and electrodes that are mostly exposed to combustion chamber airflow.
Figure 4B:
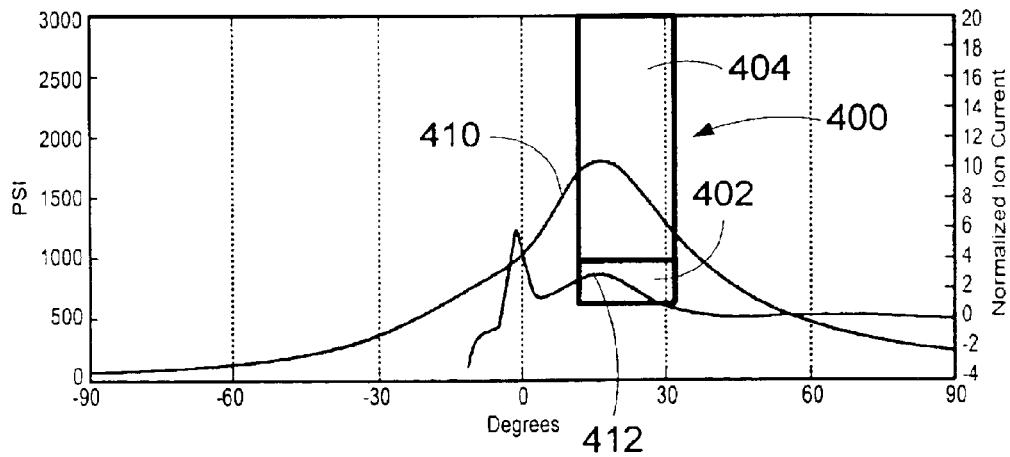
Figure 4C:
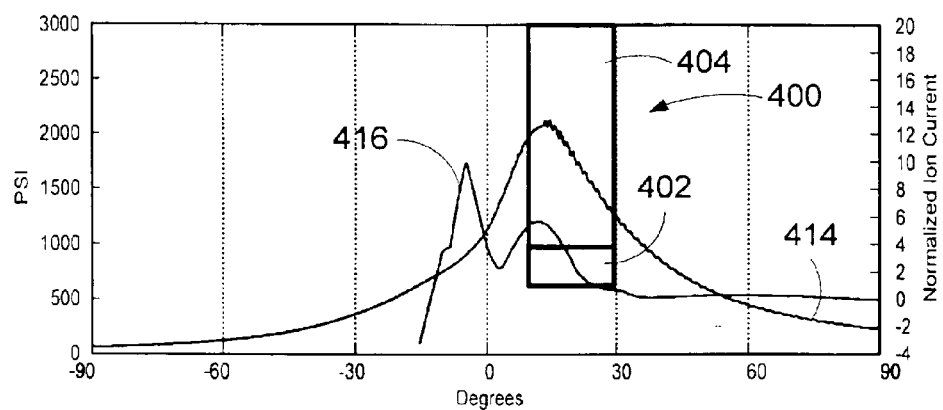
Figure 4D:
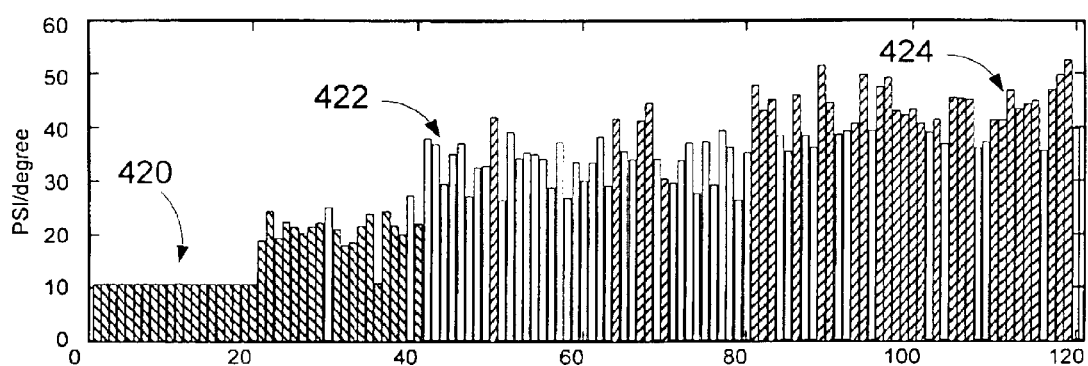
FIG. 4d is a graphical illustration of experimental data showing a correlation between the peak of the derivative of pressure of an engine cylinder as a function of crank angle and incipient knock and severe knock of the spark plug design of FIG. 4a that is used in sizing the floating bounded space of the present invention.

The ionization signals are substantially different in overall form or shape for different types of plugs. For example, the ionization signal may have a secondary peak in some spark plugs and has no secondary peak in other types of spark plugs. This means that prior methods used to detect knock based on the presence of a secondary peak in the ionization signal will not work with certain types of spark plugs. The present invention is adaptable to many or most such types of spark plugs in that the engine is characterized with the spark plug types that are used in production engines. Turning now to FIGS. 4a–4d, the floating bounded space 400 for knock is shown for a spark plug having a secondary peak. The onset of the second peak is an indication of knock. The floating bounded space 400 is sized, positioned and in this case subdivided to include a lower portion 402 and an upper portion 404 to detect incipient knock and severe knock respectively. Incipient knock occurs when the magnitude of knock is minimal and the knock won't cause immediate damage to the engine. Severe knock occurs when the magnitude of the knock is such that the knock is causing or is about to cause damage to the engine. FIG. 4a is an illustration of a representative cylinder pressure 406 and ionization signal 408 of a normal combustion condition. FIG. 4b is an illustration of a representative cylinder pressure 410 and ionization signal 412 of an incipient knock condition FIG. 4c is an illustration of a representative cylinder pressure 414 and ionization signal 416 for a severe knock condition. Knock occurs when pressure changes quickly. As a result, the engine parameter selected for characterizing the ionization signal is the peak of the derivative of pressure of a cylinder with respect to engine crank angle. Other engine parameters could be used. A representative set of data points of the engine parameter is shown in FIG. 4d. Acceptable knock 420, incipient knock 422, and severe knock 424 levels are shown.

A threshold level of the peak of the derivative of pressure of a cylinder is chosen for incipient knock and a higher threshold level of the peak of the derivative of pressure of a cylinder is chosen for severe knock. The threshold level for incipient knock is chosen such that the knock won't cause immediate damage to the engine. The threshold level for severe knock is chosen such that the knock is about to do some damage to the engine. If the peak of the derivative of pressure of a cylinder is below the threshold level for incipient knock, any knock present is within an acceptable level of knock. If the peak of the derivative of pressure of a cylinder is above the threshold level for incipient knock and below the threshold for severe knock, the knock is defined as incipient knock. If the peak of the derivative of pressure of a cylinder is above the threshold level for severe knock, the knock is defined as severe knock. For purposes of illustration, the threshold level for incipient knock is set to a value of 25 and the threshold level for severe knock set to a value of 45. It is recognized that the threshold levels must be determined during engine characterization and are based on the knock tolerance level of the engine. The stating point and size of the lower portion is determined by adjusting the starting point and size until the lower portion is of sufficient size and at a location with respect to the ionization signal and crank angle such that any portion of the ionization signal for an incipient knock condition reliably falls within the lower portion 402 and remains outside the upper portion 404 as illustrated in FIG. 4b. The starting point and size of the upper portion is determined by adjusting the starting point and size until the lower portion is of sufficient size and at a location such that any portion of the ionization signal for a severe knock condition reliably falls within the upper portion 404 as illustrated in FIG. 4c.

In one embodiment, the starting point is a fixed amount of time after the ignition event and the duration of the floating box 400 is a fixed amount of time. This time can be in terms of actual time or in terms of crank angle and is determined from the data points illustrated in FIG. 4d. The ionization signal eventually goes to quasi steady state value. The bottom of the lower portion 402 is set to a point a fixed amount above the quasi steady state value and the top of the lower portion 402 is determined from the data points. The fixed amount above the quasi steady state value is determined from the data points and is set to a location such that the ionization signals of normal combustion conditions do not fall within the floating box 400. The top of the lower portion is determined such that incipient knock conditions fall within the lower portion 402 and remain outside the upper portion 404. During operation, the quasi steady state value is determined and the lower portion 402 of the floating box 400 is placed at the fixed amount of time after the ignition event at the fixed amount above the quasi steady state value. The ionization signal analyzer 132 provides an indication to the ionization signal control module 134 that incipient knock has been detected if the analyzer determines that the ionization signal falls within the lower portion 402 while remaining outside the upper portion 404. The ionization signal analyzer 132 provides an indication to the ionization signal control module 134 that severe knock has been detected if the analyzer determines that the ionization signal falls within the upper portion 404.

Figure 5A:
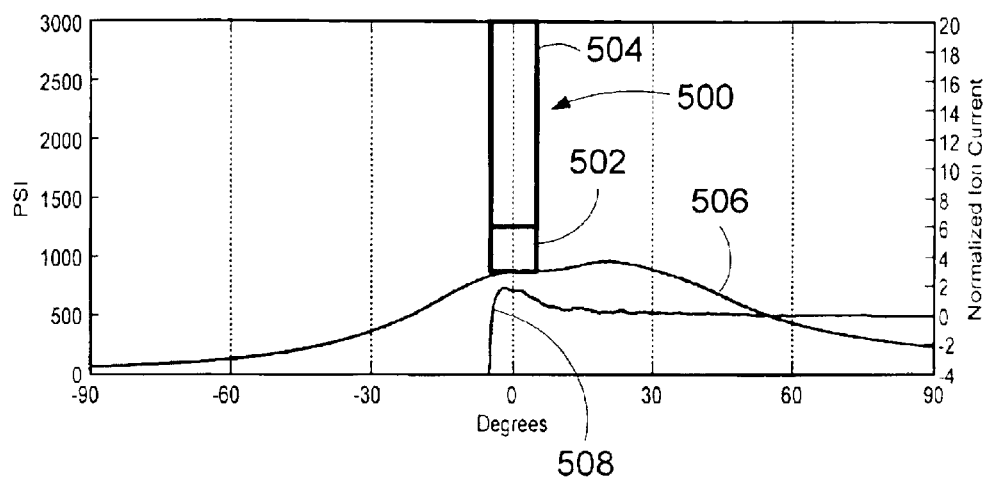
FIG. 5a is a graphical representation of pressure and ionization current versus engine piston crank angle for a normal combustion event of a spark plug design having a high electrode surface area and electrodes that are mostly shielded from combustion chamber airflow.
Figure 5B:
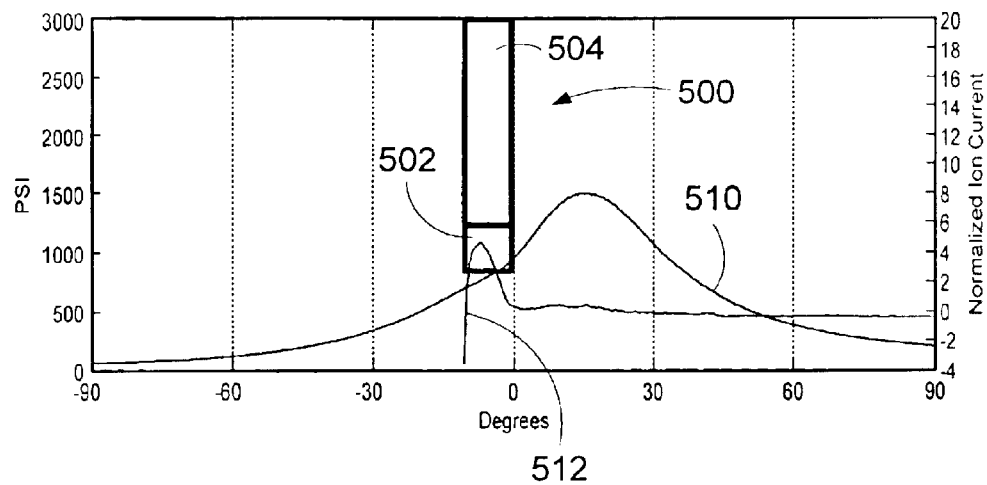
Figure 5C:
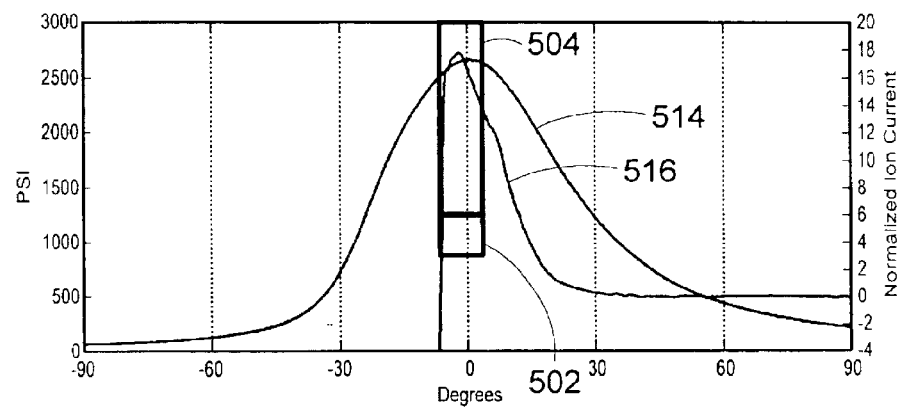
Figure 5D:
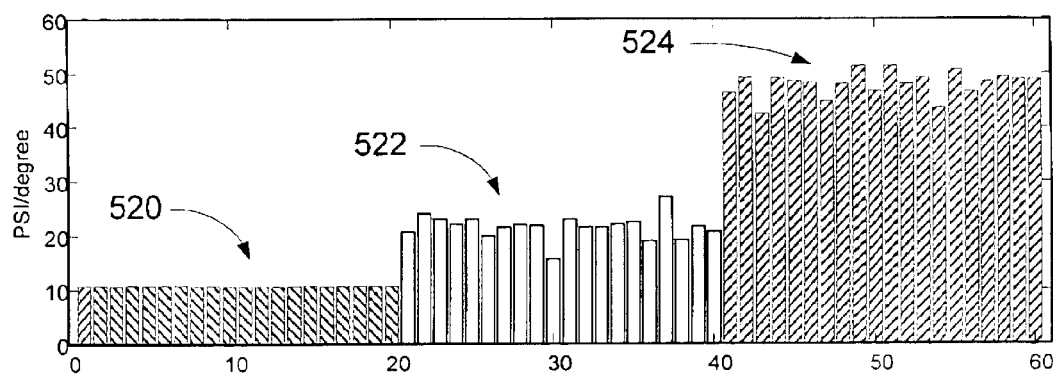
FIG. 5d is a graphical illustration of experimental data showing a correlation between the peak of the derivative of pressure of an engine cylinder as a function of crank angle and incipient knock and severe knock of the spark plug design of FIG. 5a that is used in sizing the floating bounded space of the present invention.

As previously indicated, there are some spark plug configurations (and ionization probe configurations) where the ionization signal does not have a second peak. In systems having these types of configurations, knock is present when there is a large first peak in the ionization signal. Turning now to FIGS. 5a–5d, the floating bounded space 500 for configurations having no second peak is subdivided to include a lower portion 502 and an upper portion 504 to detect the incipient knock and severe knock. FIG. 5a is an illustration of a representative cylinder pressure 506 and ionization signal 508 of a normal combustion condition. FIG. 5b is an illustration of a representative cylinder pressure 510 and ionization signal 512 for an incipient knock condition. FIG. 5c is an illustration of a representative cylinder pressure 514 and ionization signal 516 for a severe knock condition. A representative set of data points of the engine parameter is shown in FIG. 5d. Acceptable knock 520, incipient knock 522, and severe knock 524 levels are shown. The engine parameter used is the peak of the derivative of pressure of a cylinder with respect to engine crank angle. A threshold level of the peak of the derivative of pressure of a cylinder is chosen for incipient knock and a threshold level of the peak of the derivative of pressure of a cylinder is chosen for severe knock. The threshold level for incipient knock is chosen such that the knock won't cause immediate damage to the engine. The threshold level for severe knock is chosen such that the knock is about to do some damage to the engine. If the peak of the derivative of pressure of a cylinder is below the threshold level for incipient knock, any knock present is within an acceptable level of knock. If the peak of the derivative of pressure of a cylinder is above the threshold level for incipient knock and below the threshold for severe knock, the knock is defined as incipient knock. If the peak of the derivative of pressure of a cylinder is above the threshold level for severe knock, the knock is defined as severe knock. In one embodiment, the threshold level selected for incipient knock is set to a value of 15 and the threshold level for severe knock is set to a value of 45. Other values may be used. The starting point and size of the lower portion is determined by adjusting the starting point and size until the lower portion is of sufficient size and at a location with respect to the ionization signal and crank angle such that any portion of the ionization signal for an incipient knock condition reliably falls within the lower portion 502 and remains outside the upper portion 504 as illustrated in FIG. 5b. The starting point and size of the upper portion is determined by adjusting the starting point and size until the lower portion is of sufficient size and at a location such that any portion of the ionization signal for a severe knock condition reliably falls within the upper portion 504 as illustrated in FIG. 5c.

In one embodiment, the starting point is a fixed amount of time after the ignition event and the duration of the floating box 500 is a fixed amount of time. This time can be in terms of actual time or in terms of crank angle and is determined from the data points illustrated in FIG. 5d. The ionization signal eventually goes to quasi steady state value. The bottom of the lower portion 502 is set to a point a fixed amount above the quasi steady state value and the top of the lower portion 502 is determined from the data points. The fixed amount above the quasi steady state value is determined from the data points and is set to a location such that the ionization signals of normal combustion conditions do not fall within the floating box 500. The top of the lower portion is determined such that incipient knock conditions fall within the lower portion 502 and remain outside the upper portion 504. During operation, the quasi steady state value is determined and the lower portion 502 of the floating box 500 is placed at the fixed amount of time after the ignition event at the fixed amount above the quasi steady state value. The ionization signal analyzer 132 provides an indication to the ionization signal control module 134 that incipient knock has been detected if the analyzer determines that the ionization signal falls within the lower portion 502 while remaining outside the upper portion 504. The ionization signal analyzer 132 provides an indication to the ionization signal control module 134 that severe knock has been detected if the analyzer determines that the ionization signal falls within the upper portion 504.

The ionization signal control module 134 provides an indication to the air/fuel module 104 of the incipient knock conditions and the severe knock conditions and to other modules such as the engine controller. The air/fuel module 104 and spark module 106 (or the engine controller), in turn, determines what action to take. The actions that can be taken include retarding the ignition timing, running the engine leaner (e.g., adding more air to the air/fuel mixture), or shutting down the engine. The air/fuel module 104 controls fuel injection 124 and/or throttle valve 126 and spark module 106 controls the spark timing to move the engine away from the knock condition by retarding the ignition timing and/or running the engine leaner, or shutting down the engine.

The ionization signal is also used as a feedback signal to optimize combustion quality, which results in optimum engine performance (i.e., power output, brake mean effective pressure, etc.) thermal efficiency, and emissions. Optimal combustion quality, for internal combustion engines, is defined as the in cylinder combustion temperature and pressure conditions leading to an optimal placement of the centroid of the rate of heat release, which is approximately the point where fifty percent of the fuel mixture has burned, and minimum variation of IMEP to obtain various conditions of the thermodynamic efficiency/unburned hydrocarbons/$NO_x$ emission tradeoff. For example, in certain applications, the optimal combustion quality occurs when the cycle to cycle variation (coefficient of variability) in the IMEP is less than two to three percent and the end of combustion occurs within forty crank angle degrees from the start of combustion (i.e., the total combustion duration from 5% fuel burn to 95% fuel burn in a cylinder is less than forty crank angle degrees). In other applications, the optimal combustion quality occurs when the cycle to cycle variation in the IMEP is less than 1.6 percent and the total combustion duration is less than thirty five degrees.

Figure 6A:
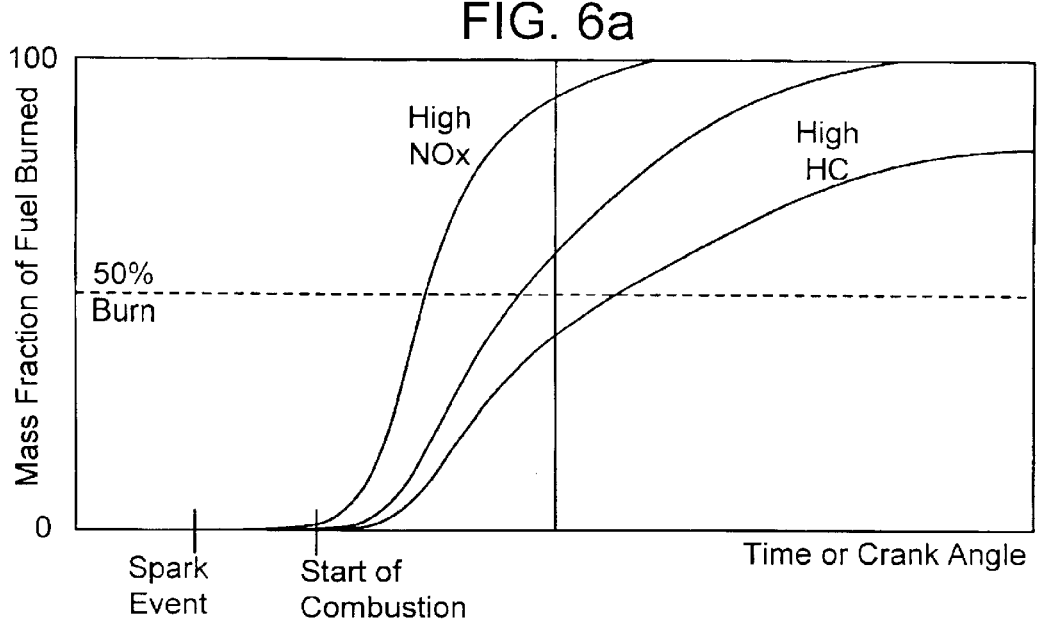
FIG. 6a is a graphical illustration of an undesirable sequence of combustion cycles having large variability in the fuel burn rate of an engine.
Figure 6B:
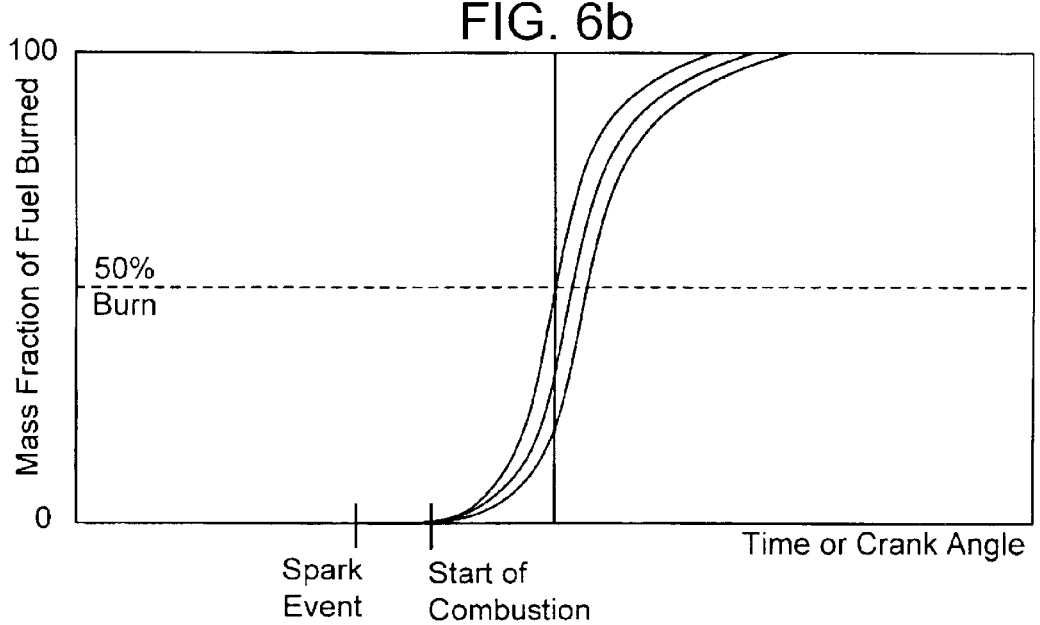
FIG. 6b is a graphical illustration of a desirable sequence of combustion cycles having minimal variability in the fuel burn rate of an engine.
Figure 7:
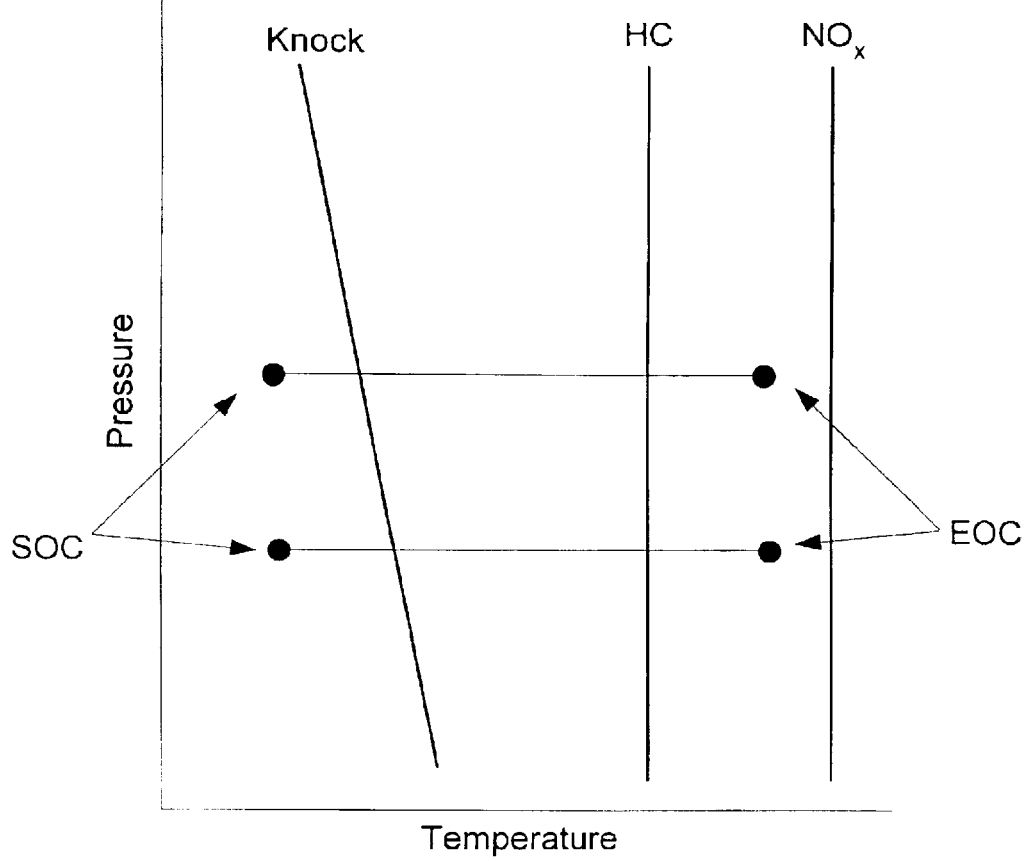
FIG. 7 is a limit diagram showing pressures and temperatures during a combustion event with regions of knock, high unburned hydrocarbons, and high $NO_x$ emissions.

FIG. 6 shows example traces of the mass fraction of fuel burned. The burn rate of a lean burn reciprocating engine is the speed at which the combustion propagates across a cylinder. When an engine is running lean of stoichiometric mixtures the combustion slows down the leaner the air/fuel ratio becomes. As the engine burns leaner, the combustion takes longer to propagate away from the spark plug. The slowing down of the combustion causes a longer burn time between the ignition point and the location in crank angles where approximately half of the mixture is burned. This position is called the "50% Burn Point." The location of the 50% burn point is nearly co-located with the centroid of heat release. Cyclic variation in the 50% burn point (and therefore the centroid of heat release) will manifest itself as a larger coefficient of variability of IMEP. FIG. 6a shows an undesirable sequence of cycles with large variability. FIG. 6b shows a desirable sequence of cycles with minimal variability. FIG. 7 is a limit diagram showing pressures and temperatures during the combustion event. It marks regions of knock, high unburned Hydrocarbons, and high $NO_x$ emissions. The start of combustion (SOC) point needs to be to the left of the knock line. The end of combustion (EOC) needs to lie between the Hydrocarbon and $NO_x$ lines.

Figure 8:
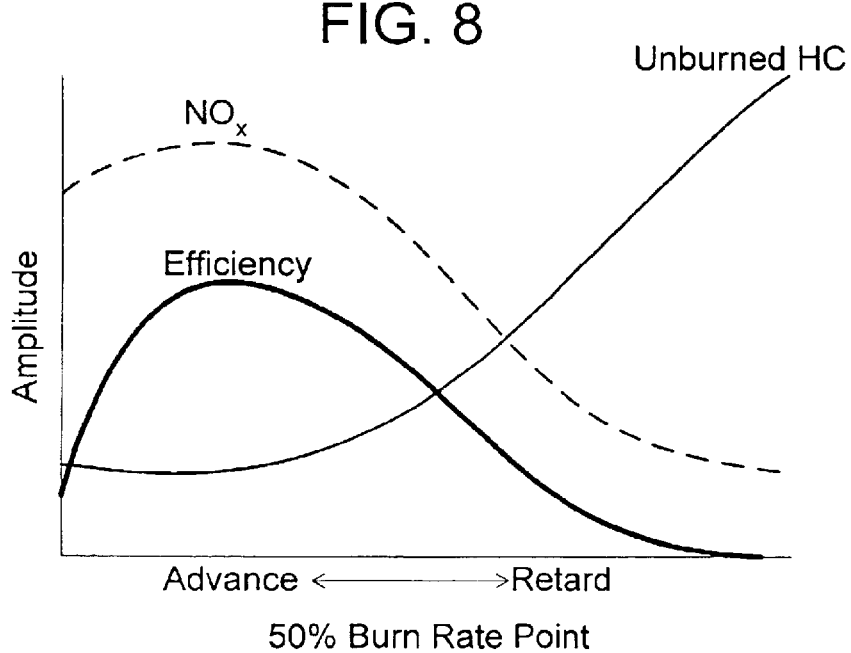
FIG. 8 is a graph illustrating the relationship between engine efficiency, $NO_x$ emissions, unburned hydrocarbons and the 50% burn rate of an engine.

FIG. 8 shows the practical application of FIG. 7. As the 50% burn point is advanced, both power and $NO_x$ increases. As the 50% burn point is retarded, efficiency and $NO_x$ emissions decrease and unburned Hydrocarbons increase. The controller is more able to provide the desired efficiency, unburned Hydrocarbon and $NO_x$ tradeoff the lower the variation is in the 50% burn point location.

Figure 9:
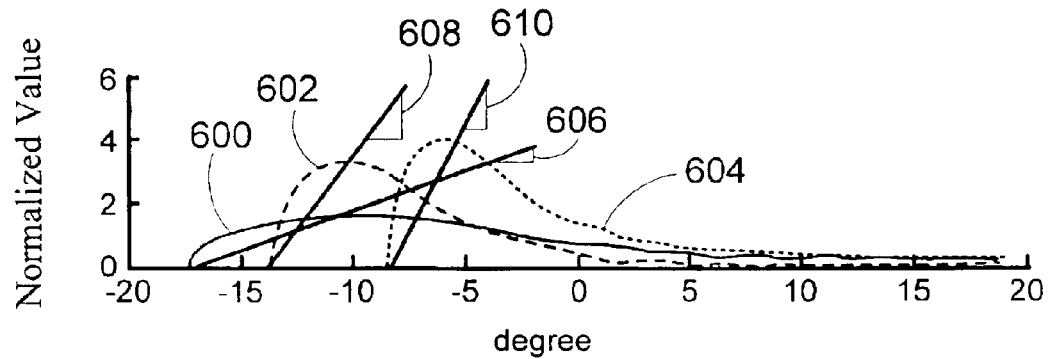
FIG. 9 is a graphical illustration of experimental data showing the correlation between the combustion quality and the slope of a line starting at an initial ionization current and a peak of the ionization current in accordance with the teachings of the present invention.
Figure 10:
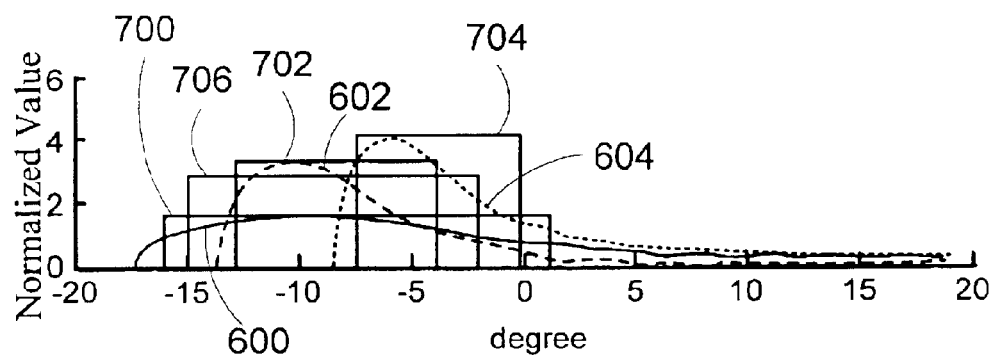
FIG. 10 is a graphical illustration of experimental data showing ionization current at different air/fuel ratios and a box used to determine the combustion quality in accordance with the teachings of the present invention.

Turning now to FIGS. 9 and 10, the combustion quality of the lean burn reciprocating engine can be determined from a geometric parameter of the ionization signal. The geometric parameter may be a parameter that can be unique (e.g., is calibrated) for each cylinder of an engine. A plurality of ionization signals is processed to produce a representative resultant ionization signal. The processing minimizes variations from cycle to cycle. In one embodiment, the signals are processed to extract relevant parameters and the parameters are averaged to produce the resultant ionization signal. The parameters include the ionization signal starting point and the peak of the ionization signal. The ionization signal starting point can be either the ignition timing point (i.e., the starting point of combustion) or the starting point of the resultant ionization signal. When the starting point of the resultant ionization signal is used as the ionization signal starting point, the magnitude of the ionization signal starting point is determined by setting the magnitude to be the average of the ionizations signals over a region where the ionization signal has stabilized. In FIGS. 9 and 10, this average is shown as the normalized value of zero. The starting point becomes the point in the curves where the ionization signal crosses the normalized value of zero. FIGS. 9 and 10 show resultant ionization signals for various air/fuel ratios. Curve 600 is a resultant ionization signal for an engine operating at an air/fuel ratio corresponding to a λ of 1.72. Curve 602 is a resultant ionization signal for an engine operating at an air/fuel ratio corresponding to a λ of 1.67. Curve 604 is a resultant ionization signal for an engine operating at an air/fuel ratio corresponding to a λ of 1.64. It can be seen that the ionization signal is advancing as λ increases. The advance is occurring because the spark timing is advancing and the ionization signal is acquired after ignition has occurred.

Referring to FIG. 9, the geometric parameter is the slope 604, 606, 608 of a line drawn from the ionization signal starting point and passing through the peak of the resultant ionization signal. The combustion quality is determined from the slope of the line. The combustion quality is adjusted by changing combustion parameters until the slope is approximately equal to the slope corresponding to a desired combustion quality as determined from the test engine and/or from actual operating conditions. In one embodiment, the combustion parameter is the air/fuel ratio and the air/fuel ratio, which may be determined as a function of the slope, is adjusted until the slope of the line is approximately equal to the desired slope.

An alternate embodiment of determining the combustion quality is illustrated in FIG. 10. The geometric parameter used is an aspect ratio of a box drawn around the signal. The lower left corner of the box is the ionization signal starting point, the top of the box is at the peak of the resultant ionization signal, and a right side of the box is at a percentage of the peak of the resultant ionization signal. The box parameters (i.e., lower left corner, top, and percentage) may vary with engine operating conditions, such as speed and engine load. Box 700 corresponds to ionization signal 600, box 702 corresponds to ionization signal 602, and box 704 corresponds to ionization signal 604. The combustion quality is adjusted based upon the aspect ratio of a box 700, 702, 704. The aspect ratio is compared to the reference aspect ratio of a reference box 706 and combustion parameters are adjusted until the aspect ratio is approximately equal to the reference aspect ratio. The reference aspect ratio corresponds to a desired combustion quality.

Figure 11:
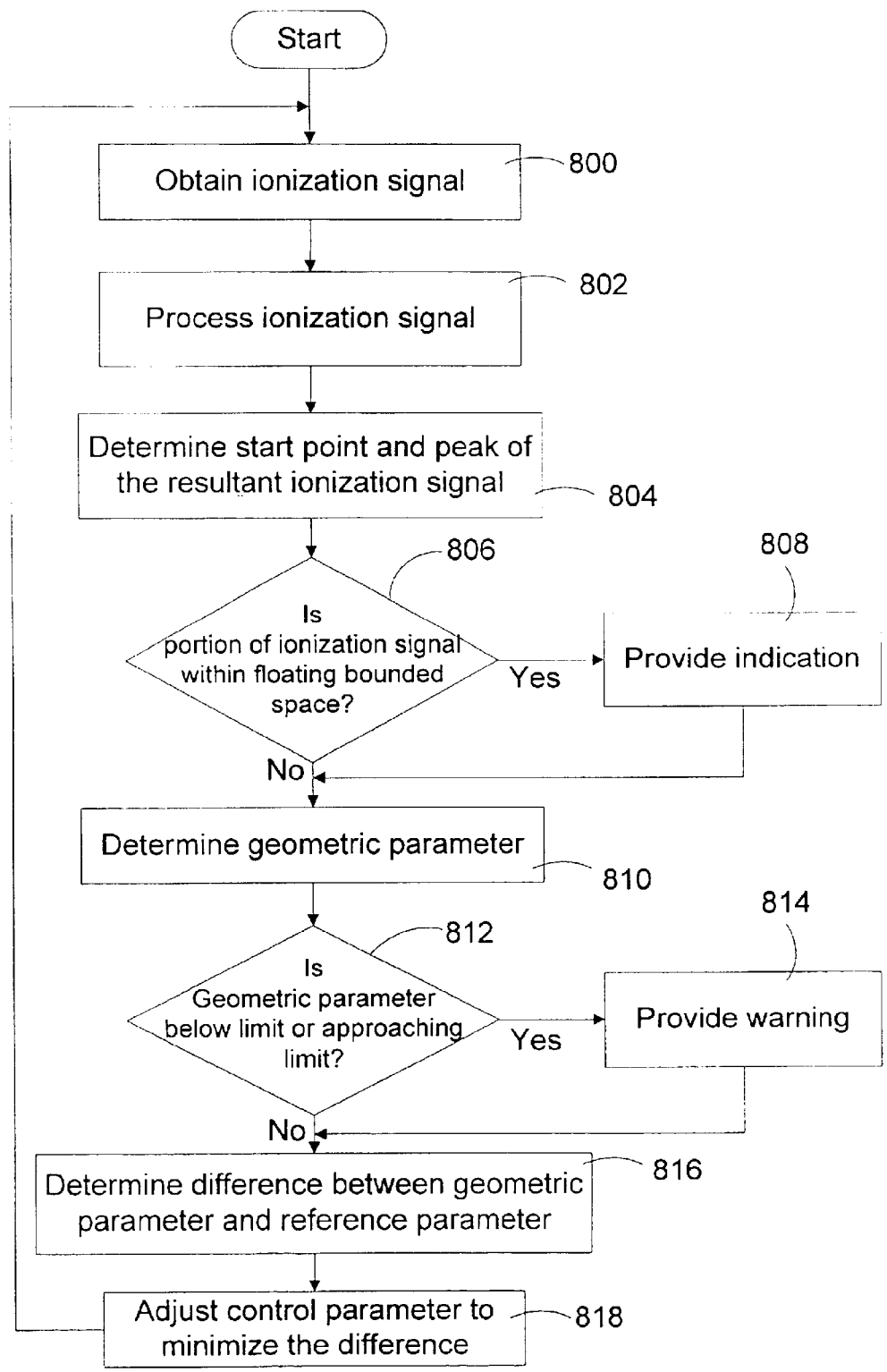
FIG. 11 is a flow chart illustrating the steps to determine an abnormal combustion condition and to control the combustion quality in accordance with the teachings of the present invention.

Turning now to FIG. 11, the steps of analyzing and controlling the combustion quality of a lean burn reciprocating engine are shown. While the steps will be described sequentially, it is recognized that the steps may be performed sequentially, in parallel, a combination of sequentially and parallel, and in different order. A succession of ionization signals of the lean burn reciprocating engine for successive cycles (i.e., combustion events) of a running engine is obtained (step 800).

The ionization signals are processed for signal stability and a resultant ionization signal is determined (step 802). An ionization signal starting point and a peak for the resultant ionization signal is determined using an initial level for all of the signals (step 804). The ionization signals are checked to determine if a portion of an ionization signal is within a floating bounded space 300, 400, 500 (step 806). An indication is provided if a portion of an ionization signal is within a floating bounded space 300, 400, 500 (step 808).

Figure 12:
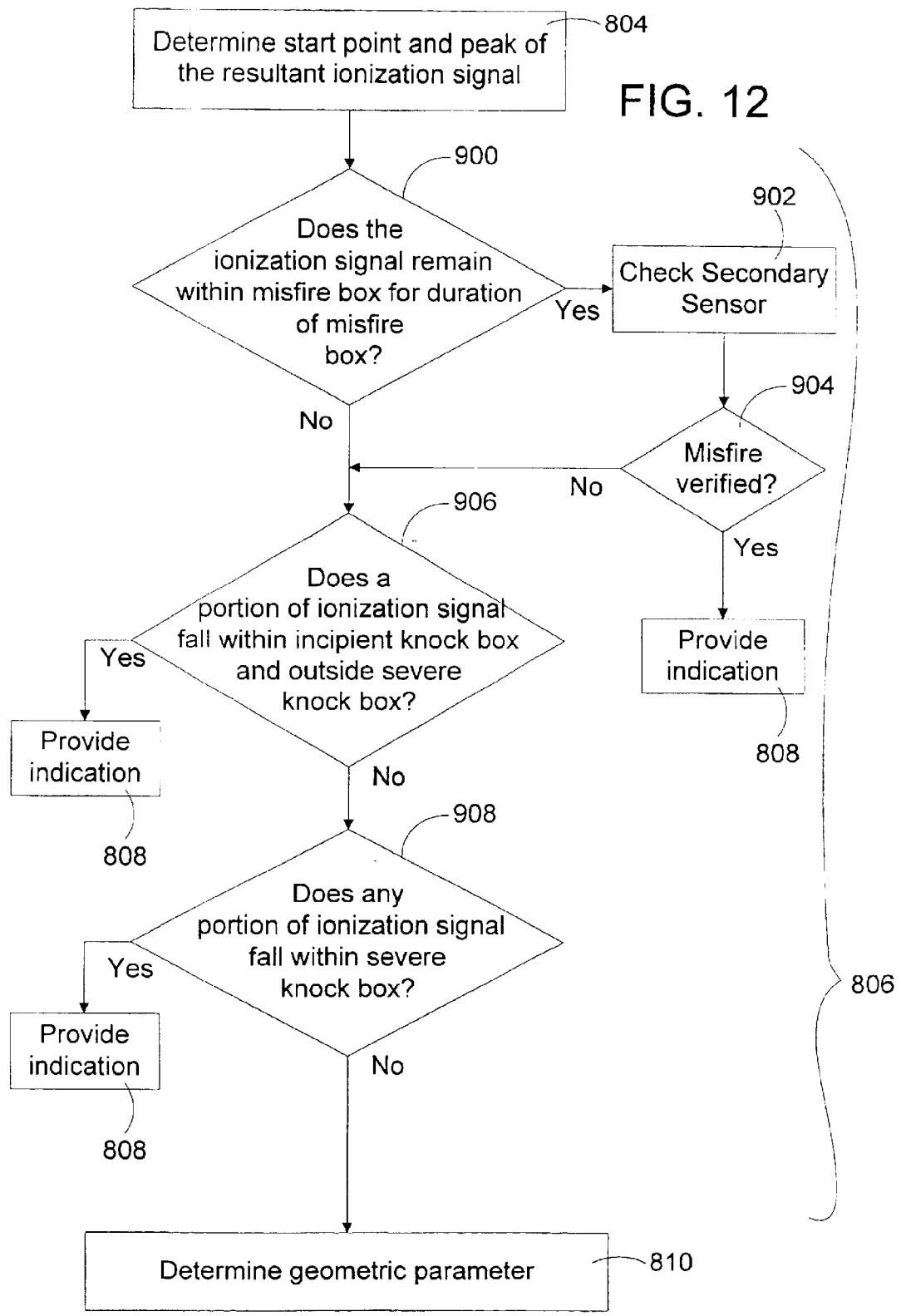
FIG. 12 is a flow chart illustrating the steps to determine the abnormal combustion condition of FIG. 11.
Figure 13:
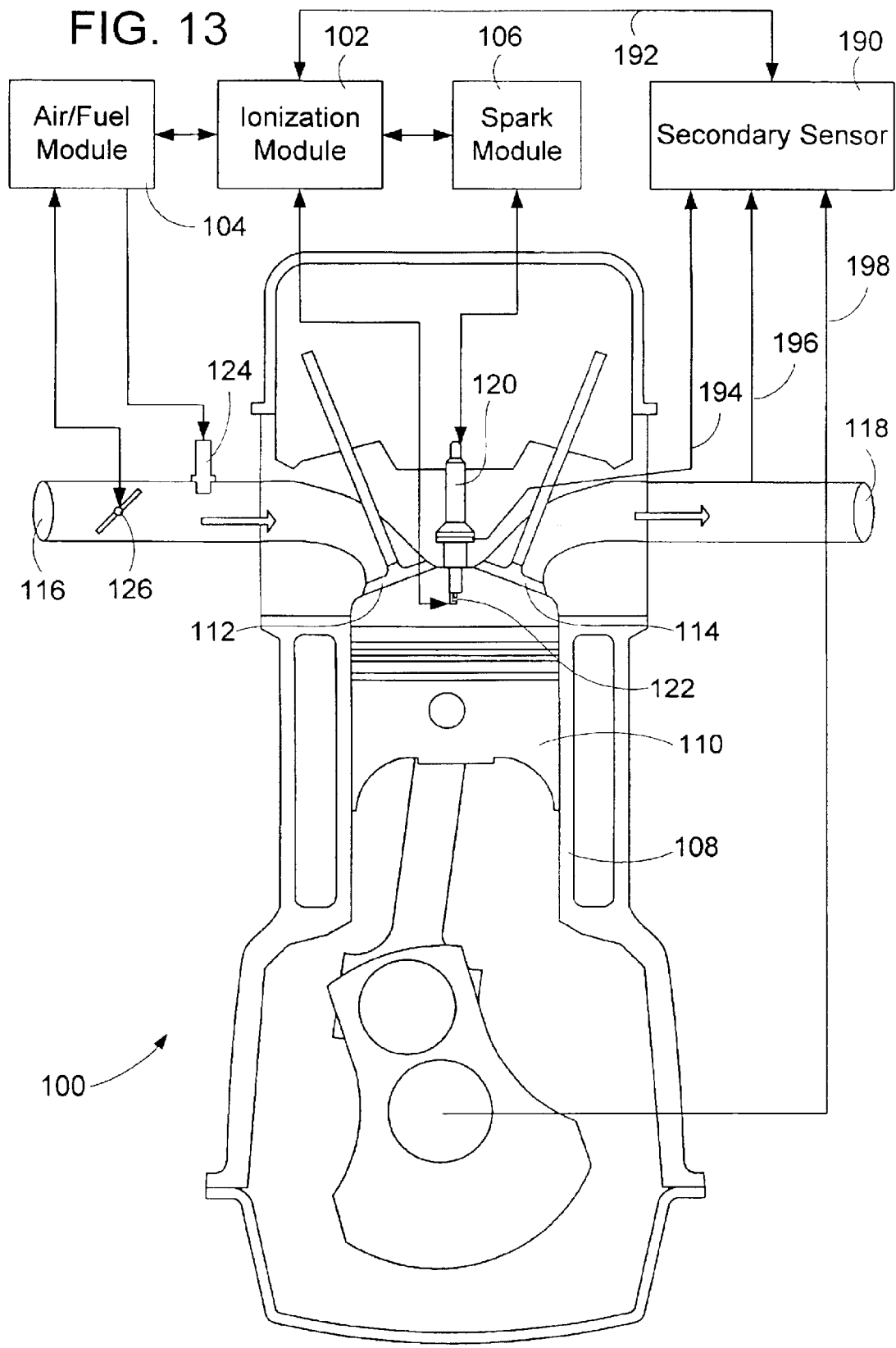
FIG. 13 is a schematic view of the combustion quality control of FIG. 1 illustrating the use of a secondary source in accordance with the teachings of the present invention.

Turning to FIG. 12, step 806 includes determining if a portion of an ionization signal is within floating bounded space 300 for the duration of the floating bounded space 300 (step 900). Some engines have sensors or other engine performance indicators that can be used as a secondary sensor to verify that a misfire has occurred. If a portion of the ionization signal is within the floating bounded space for an extended interval corresponding to the duration of the floating bounded space and a secondary sensor is available on the engine, the secondary sensor is checked (step 902) to verify that a misfire has occurred. If available, the secondary sensor is used to eliminate the possibility that that drift of the flame kernel produced by the spark plug 118 has moved out of the spark gap 120 before the ionization module 102 has detected the ionization signal. The secondary sensor is checked to see if the engine is operating normally. FIG. 13 illustrates the secondary sensor. The secondary sensor 190 provides a secondary signal 192 to the ionization module 102. The secondary signal 192 may be a pressure signal 194, exhaust temperature 196, IMEP, instantaneous crank angle velocity 198, or other signals such as from an oxygen sensor and the like. If the secondary signal indicates a misfire has occurred (step 904), an indication of misfire is provided (step 808).

The ionization signal is also checked to determine if any portion of the ionization signal falls within the lower portion 402, 502 floating bounded space 400, 500, and no portion falls within the upper portion 404, 504 of floating bounded space 400, 500 (step 906). If any portion of the ionization signal falls within the lower portion 402, 502 floating bounded space 400, 500, and no portion falls within the upper portion 404, 504 of floating bounded space 400, 500, an indication of incipient knock is provided (step 808).

The ionization signal is also checked to determine if any portion of the ionization signal falls within upper portion 404, 504 of floating bounded space 400, 500 (step 908). If any portion of the ionization signal falls within the upper portion 404, 504 of floating bounded space 400, 500, an indication of severe knock is provided (step 808).

Returning back to FIG. 11, a geometric parameter associated with the resultant ionization signal is determined (step 810). The slope or aspect ratio described above is used for the geometric parameter in one embodiment. The geometric parameter is compared to a limit equivalent to the combustion quality limit. The parameter is checked to determine if the parameter is below the limit or is approaching the limit (step 812). An indication is provided if the geometric parameter is above the limit or is approaching the limit (step 814). For example, if the limit is slope 606, the indication is provided if the measured slope approaches slope 606 or is below slope 606. Similarly, if the limit is the aspect ratio of box 700, the indication is provided if the measured aspect ratio is approaching or is below the aspect ratio of box 700. The indication provides the engine controller with the ability to adjust the combustion quality to operate the engine with a lower likelihood of having a misfire condition.

The geometric parameter is also compared against a reference geometric parameter and the error difference between the geometric parameter and the reference geometric parameter is determined (step 816). The reference geometric parameter is related to a desired combustion quality in a system having an air/fuel ratio relating to a λ greater than 1.4. A control parameter of the engine is adjusted such that an error difference between the geometric parameter and the reference geometric parameter is minimized (step 818). The control parameter is any parameter that affects the combustion quality. The control parameter may be air flow, fuel flow, spark timing, EGR valve position, throttle position, etc. For example, if the geometric parameter indicates the engine is operating too lean, fuel flow can be increased, air flow may be reduced, etc. Steps 800 to 818 are repeated for subsequent combustion events of the lean burn reciprocating engine.

The cylinders in an engine do not necessarily see the same amount of air all the time due to the geometry of the intake manifold and exhaust manifold. In such situations, this means that the airflow must be known and calibrated prior to engine operation. An ionization signal from each engine cylinder can be acquired with the present invention, which provides the ability to individually control each engine cylinder. As a result, the fuel and/or air flow to each cylinder of an engine can be trimmed in real time, mitigating the airflow differences.

The burn rate of a lean burn reciprocating engine can be used to optimize combustion quality and for the control of the individual cylinder fuel delivery. Burn rate is the speed at which the combustion propagates across a cylinder. When an engine is running lean of stoichiometric mixtures, the combustion slows down as the air/fuel ratio becomes leaner and the combustion takes longer to propagate away from the spark plug. The slowing down of the combustion causes a longer burn time between the ignition point and the location in crank angles where approximately half of the mixture is burned. This position is called the "50% burn point" and is typically measured in crank angle degrees. The fifty percent burn point is typically calculated from the cylinder pressure.

Figure 14:
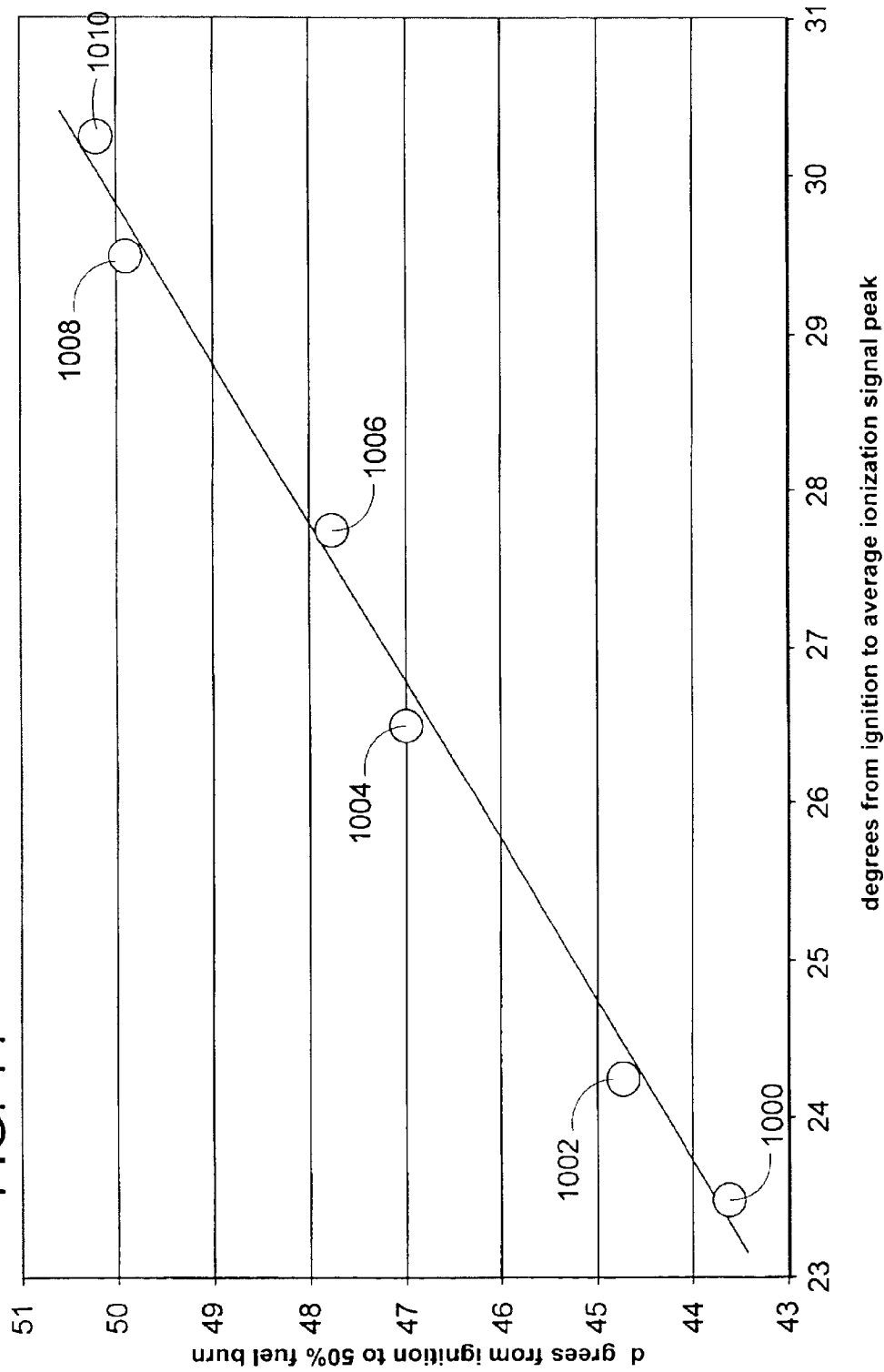
FIG. 14 is a graph illustrating a burn rate relationship between a 50% fuel burn location and an average ionization signal peak location in a typical natural gas power generation engine operating with air/fuel ratios corresponding to an excess-air factor lambda in the range of 1.59 to 1.67.

The time between the ignition event and the peak chemical ionization point (i.e., the peak of the ionization signal, or in the case of an ionization signal having multiple peaks, the first peak) in the ionization signal determines a degree factor or slope that correlates with the burn rate. This time or number of degrees between the ignition point and the peak of the chemical ionization has a linear and proportional relationship to burn rate. For example, FIG. 14 illustrates the relationship between a fifty percent (50%) burn and the average peak of the ionization signal as a function of degrees from ignition for various air/fuel ratios in a test engine operating with λ is greater than 1.4. Ignition, as used in FIGS. 14 and 15, is defined as the time occurrence of the start of the spark event. The 50% fuel burn point is approximately at the same point in the combustion cycle where the cylinder pressure peaks. The power output and emissions tradeoff can be adjusted by controlling the 50% burn point to remain at a desired location for each cylinder, and in one embodiment, the same location for all cylinders. In FIG. 14, data point 1000 corresponds to a λ of 1.59, data point 1002 corresponds to a λ of 1.61, data point 1004 corresponds to a λ of 1.62, data point 1006 corresponds to a λ of 1.64, data point 1008 corresponds to a λ of 1.66, and data point 1010 corresponds to a λ of 1.67. It can be seen that the relationship between the 50% burn rate location and the location of the average peak of the ionization signal is linear for the air-fuel ratios corresponding to A ranging from 1.59 to 1.67. Similarly, FIG. 15 illustrates the relationship between the 50% burn rate location and the location of the average peak of the ionization signal as a function of degrees from ignition for various air/fuel ratios in a test engine operating with λ is greater than 1.6, and more specifically, in the range of 1.6 to 1.765. In FIG. 15, data point 1012 corresponds to a λ of 1.6, data point 1014 corresponds to a λ of 1.663, data point 1016 corresponds to a λ of 1.698, data point 1018 corresponds to a λ of 1.731, data point 1020 corresponds to a λ of 1.755, and data point 1022 corresponds to a λ of 1.765.

By knowing the correlation between the average ionization signal peak and the 50% burn point, the combustion performance can be optimized by controlling the engine based on the location of the average ionization signal peak. With knowledge of the correlation, the ionization measurement can provide a way to equalize the burn rate on an individual cylinder basis. For example, for a given engine if λ is 1.64, the spark timing is adjusted until the peak of the ionization signal is approximately 27.5° from ignition to locate the 50% burn point at approximately 48° from the ignition point, or about 20° after top dead center (TDC). Alternatively, the falling edge of the first peak of the ionization signal may be used. For example, the aspect ratio described previously may be used with the reference aspect ratio corresponding to the desired burn rate. For each engine operating condition there is proper crank angle degree for the location of the average of the peak chemical ionization point that can be designated for the desired emissions target and/or fuel efficiency target of the engine. Equalizing the crank angle degree for each cylinder allows for optimum ignition timing for each cylinder. This burn rate information needs to relate to the crank angle degrees, or position of the piston in the engine, in order to use it for proper engine control. Averaging may be necessary to remove the cycle to cycle differences such that the ionizations local sensor effects are filtered out and a correlation holds true. The thermal efficiency, $NO_x$ emissions, and other parameters of the engine can be optimized in a similar fashion.

Equalizing the burn rate for all cylinders may result in the cylinders having different air/fuel ratios and different power levels due to the different airflows and different fueling rates. However, these differences will add up to the lowest possible emissions. With the same burn rate, all cylinders can have similar ignition timing, unless detonation is occurring on a specific cylinder. If all cylinders have the same burn rate, the fuel efficiency can also be maximized for the engine, while minimizing the $NO_x$ plus HC emissions sum.

The emissions and fuel economy of a lean burn engine are sometimes working against each other at the lean limit of an engine. Some cylinders have different compression ratios and others have a different level of charge motion. As a result, the lean limit of an engine is usually reached when the weakest cylinder (i.e. the cylinder with the slowest burning combustion) begins to misfire. At this point, the strongest cylinder will be generating the most $NO_x$ and the weakest cylinder will be generating the most unburned hydrocarbons. To obtain the most even combustion condition, it is possible to equalize the burn rate for an engine. The net effect of equalizing the burn rate is providing the weak cylinders with more fuel and providing the strong cylinders with less fuel. This may cause the individual cylinders to all run at slightly different air/fuel ratios, but all cylinders will have consistent combustion, which delivers the lowest total emissions, with the best fuel efficiency tradeoff.

Controlling the consistency of a stoichiometric engine still requires at least one global oxygen sensor to provide the accurate sensing of the air/fuel ratio for optimum catalyst operation. In lean burn engines, use of the ionization signal provides ideal optimization performance and consistent lean operating conditions on each cylinder through the combination of the burn rate control with abnormal combustion detection (e.g., misfire and knock). The combination of abnormal combustion detection and combustion quality control together produce the maximum efficiency and lowest NOx emission of a lean burn engine.

One important factor for using ionization signals as a control feedback is the sensing quality of the ionization signal. Short duration spark discharges typical of capacitive discharge (CD) ignition systems allow for ionization sensing to begin within 300 µs after the initial spark has occurred. This is a significantly shorter time delay period than an inductive ignition system can provide, which has a typical spark duration of 1.5 to 3 ms. Beginning ionization sensing within a few hundred microseconds after spark provides data during the chemical ionization phase (primarily flame propagation in the vicinity of the spark gap) that would otherwise be missed with longer duration ignition systems. Capacitive discharge systems also use a large capacitance for high current spark discharges that can generate a 100 ampere peak for 3 µs when discharging during ignition. The ionization current is approximately 30 to 50 uA. The large capacitance retains most of its charge during the ionization portion of the combustion process and can be used to hold the voltage essentially constant across the spark plug electrodes for measuring the ionization signal. Another benefit of capacitive discharge systems over inductive ignition systems is the low resistance and inductance of the secondary winding of the capacitive discharge coil, which allows for a higher current flow through the secondary windings during the ionization phase. This combined with the ability to present a higher voltage across the gap also improves the ionization signal-to-noise ratio. Specific to the detection of knock, the low inductance allows the high frequency to pass through the coil. The combination of improved lean burn ignition plus ionization feedback for misfire purposes is especially useful in cold starting engines and operating just inside the misfire limit for leanest possible cold starts in a closed loop fashion.

It can be seen from the foregoing that a system and method of the present invention provides the ability to detect abnormal combustion conditions and control combustion quality in a lean burn reciprocating engine using ionization signals. The present invention provides the ability to control the fuel in a lean burn engine utilizing the time or degrees from ignition to the peak of the chemical ionization phase and in one embodiment, equalizes that time (or degrees) for all cylinders. Additionally, the ability to control the fuel in a lean burn engine utilizing the time or degrees from the ignition event to the falling edge of the chemical ionization curve to determine the burn rate of the engine has been described. The slope from the starting point to the peak of the ionization signal indicates rate and intensity put together; if we equalize slope the more intense burning cylinders get leaned out to a greater extent, given they can handle the greater lean limit this may be the right approach for some engines.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

An apparatus and method to detect abnormal combustion conditions in a lean burn reciprocating engine and control the combustion quality using ionization signals has been described. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method to analyze the combustion quality of a lean burn reciprocating engine comprising the steps of:

processing a plurality of related ionization signals of a lean burn reciprocating engine to create a resultant ionization signal, the lean burn reciprocating engine operating with an air/fuel ratio corresponding to a greater than 1.4;

identifying an ionization signal starting point and a peak of the resultant ionization signal;

associating a geometric parameter with the resultant ionization signal that relates the ionization signal starting point to the peak of the resultant ionization signal; and providing an indication of the combustion quality based upon the geometric parameter.

2. The method of claim 1 further comprising the step of adjusting the combustion quality based upon the indication of the combustion quality.

3. The method of claim 1 wherein the geometric parameter is a slope of a line from the ionization signal starting point and passing through the peak of the resultant ionization signal and the step of adjusting the combustion quality based upon the geometric parameter comprises the step of adjusting a combustion parameter until the geometric parameter matches a desired geometric parameter.

4. The method of claim 1 wherein the geometric parameter is an aspect ratio of a box having a lower left corner at the ionization signal starting point, a top at the peak of the resultant ionization signal, and a right side at a percentage of the peak of the resultant ionization signal, the step of adjusting the combustion quality based upon the geometric parameter comprises the steps of comparing the aspect ratio to a reference aspect ratio and adjusting a combustion parameter such that a difference between the aspect ratio and the reference aspect ratio is minimized.

5. The method of claim 1 further comprising the steps of:

determining if the geometric parameter is one of approaching a limit and below a limit, the limit corresponding to an combustion quality limit at which the engine has a high likelihood of misfiring; and wherein the step of providing an indication of combustion quality comprises providing an indication that the geometric parameter is one of approaching the limit and below the limit if the geometric parameter is one of approaching the limit and below the limit.

6. The method of claim 5 further comprising the step of adjusting an engine control parameter based on the indication that the geometric parameter is one of approaching the limit and below the limit such that the geometric parameter moves above the limit.

7. The method of claim 1 wherein the ionization signal starting point comprises one of an ignition timing point and a starting point of the resultant ionization signal.

8. The method of claim 1 wherein the geometric parameter is a calibrateable parameter for each cylinder of the lean burn reciprocating engine.

9. A method for analyzing the combustion quality in a lean burn reciprocating engine comprising the steps of:

receiving a succession of ionization signals of the lean burn reciprocating engine for successive cycles of a running engine;

processing a plurality of related ionization signals for signal stability;

identifying, using an initial current level for all of the signals, an ionization signal starting point and a peak for the ionization signal;

associating a geometric parameter with the ionization signal which relates the ionization signal starting point to the peak for the ionization signal; comparing the geometric parameter against a reference geometric parameter related to a desired combustion quality for an air/fuel ratio relating to λ greater than 1.4; and providing an indication of combustion quality.

10. The method of claim 9 further comprising the step of adjusting a control parameter of the engine based upon the indication of combustion quality such that an error difference between the geometric parameter and the reference geometric parameter is minimized.

11. The method of claim 10 further comprising the step of maintaining the error difference at approximately a zero level.

12. The method of claim 9 wherein the geometric parameter is a slope of a line from the ionization signal starting point and passing through the peak of the ionization signal.

13. The method of claim 9 wherein the geometric parameter is an aspect ratio of a box having a lower left corner at the ionization signal starting point, a top at the peak of the ionization signal, and a right side at a percentage of the peak of the ionization signal.

14. The method of claim 9 wherein the geometric parameter is a time from the start point of the ionization signal to the peak of the ionization signal.

15. The method of claim 9 further comprising the steps of:

determining if the geometric parameter is one of approaching a limit and below a limit, the limit corresponding to an combustion quality limit at which the engine has a high likelihood of misfiring; and wherein the step of providing an indication of combustion quality comprises providing an indication that the geometric parameter is one of approaching the limit and below the limit if the geometric parameter is one of approaching the limit and below the limit.

16. The method of claim 15 further comprising the step of adjusting an engine control parameter based on the indication that the geometric parameter is one of approaching the limit and below the limit such that the geometric parameter moves above the limit.

17. The method of claim 9 wherein the geometric parameter is a calibrateable parameter for each cylinder of the lean burn reciprocating engine.

18. A system for controlling the combustion quality in a lean burn reciprocating engine comprising:

means for receiving a succession of ionization signals of the lean burn reciprocating engine for successive cycles of a running engine;

means for processing a plurality of related ionization signals for signal stability;

means for identifying, using an initial current level for all of the signals, an ionization signal starting point and a peak for the ionization signal;

means for associating a geometric parameter with the ionization signal which relates the ionization signal starting point to the peak for the ionization signal; comparing the geometric parameter against a reference geometric parameter related to a desired combustion quality relating to λ greater than 1.4; and means for outputting an indication of combustion quality.

19. The method of claim 18 further comprising means for adjusting a control parameter of the engine based on the indication of combustion quality such that an error difference between the geometric parameter and the reference geometric parameter is minimized.

20. The method of claim 18 wherein the geometric parameter is a calibrateable parameter for each cylinder of the lean burn reciprocating engine.

21. A system for analyzing the combustion quality in a lean burn reciprocating engine comprising:

an ionization module for measuring a succession of ionization signals of the lean burn reciprocating engine for successive cycles of a running engine and processing a plurality of related ionization signals for signal stability, identifying, using an initial current level for all of the signals, an ionization signal starting point and a peak for the resultant ionization signal, associating a geometric parameter with the resultant ionization signal which relates the ionization signal starting point to the peak for the resultant ionization signal, compares the geometric parameter against a reference geometric parameter related to a desired air/fuel ratio relating to λ greater than 1.4 and outputting an indication of combustion quality.

22. The system of claim 21 further comprising an air/fuel module for adjusting a control parameter of the lean burn reciprocating engine based on the indication of combustion quality such that an error difference between the geometric parameter and the reference geometric parameter is minimized.

23. The system of claim 21 wherein the lean burn reciprocating engine has a plurality of cylinders and the ionization module is coupled to each of the plurality of cylinders and the air/fuel ratio module adjusts a control parameter of the lean burn reciprocating engine for each cylinder independently based upon the geometric parameter corresponding to the respective cylinder.

24. The system of claim 21 wherein the ionization signal starting point comprises one of an ignition starting point and a starting point of the resultant ionization signal.

25. The system of claim 21 wherein the ionization module includes one of an ionization probe and a spark plug having a spark gap.

26. The system of claim 21 wherein the geometric parameter is a slope of a line from the ionization signal starting point and passing through the peak of the resultant ionization signal.

27. The system of claim 21 wherein the geometric parameter is an aspect ratio of a box having a lower left corner at the ionization signal starting point, a top at the peak of the resultant ionization signal, and a right side at a percentage of the peak of the resultant ionization signal.

28. The system of claim 21 wherein the geometric parameter is a time between the ionization signal starting point and the peak of the resultant ionization signal.

29. The method of claim 21 wherein the geometric parameter is a calibrateable parameter for each cylinder of the lean burn reciprocating engine.

30. A method for analyzing the combustion quality in a lean burn reciprocating engine comprising the steps of:

receiving a succession of ionization signals of the lean burn reciprocating engine for successive cycles of a running engine;

for each ionization signal of the succession of ionization signals:

measuring the variation of the ionization signal with respect to an engine parameter of the lean burn reciprocating engine;

associating a floating bounded space with the ionization signal such that the floating bounded space captures a characteristic of the ionization signal which distinguishes an abnormal combustion condition from a normal combustion condition for an engine operating with an air to fuel ratio corresponding to a λ greater than 1.4;

determining if a portion of the ionization signal is within the floating bounded space;

providing an indication that an abnormal combustion condition has been detected if the portion of the ionization signal is within the floating bounded space;

processing a plurality of related ionization signals for signal stability;

identifying, using an initial current level for all of the signals, an ionization signal starting point and a peak for the ionization signal;

associating a geometric parameter with the ionization signal which relates the ionization signal starting point to the peak for the ionization signal; comparing the geometric parameter against a reference geometric parameter related to a desired air/fuel ratio relating to λ greater than 1.4; and providing an indication of combustion quality.

31. The method of claim 30 further comprising the step of adjusting a control parameter of the engine based on the indication of combustion quality such that an error difference between the geometric parameter and the reference geometric parameter is minimized.

32. The method of claim 30 further comprising the steps of:

determining if the geometric parameter is one of approaching a limit and below a limit, the limit corresponding to an combustion quality limit at which the engine has a high likelihood of misfiring; and providing an indication that the geometric parameter is one of approaching the limit and below the limit.

33. The method of claim 32 further comprising the step of adjusting an engine control parameter based on the indication that the geometric parameter is one of approaching the limit and below the limit such that the geometric parameter moves above the limit.

34. The method of claim 30 wherein the abnormal combustion condition is a misfire and the step of determining if the portion of the ionization signal is within the floating bounded space comprises the step of determining if the portion of the ionization signal remains within the floating bounded space for an extended interval corresponding to the duration of the floating bounded space.

35. The method of claim 34 further comprising the step of confirming that the misfire has occurred by checking a secondary sensor.

36. The method of claim 30 wherein the abnormal combustion condition is knock and the step of determining if the portion of the ionization signal is within the floating bounded space comprises the step of determining if any portion of the ionization signal is within the floating bounded space.

37. The method of claim 36 wherein the floating bounded space comprises a first portion and a second portion and the step of determining if the portion of the ionization signal is within the floating bounded space comprises the step of determining if any portion of the ionization signal is within one of the first portion and the second portion.

38. The method of claim 36 wherein the step of providing the indication comprises the step of providing one of an indication of incipient knock if any portion of the ionization signal is within the first portion and an indication of severe knock if any portion of the ionization signal is within the second portion.

39. The method of claim 30 further comprising the step of adjusting at least one of a position and size of the floating bounded space as a function of engine operating conditions, the engine operating conditions including at least one of an engine speed, an engine load, and a desired combustion quality.

40. The method of claim 30 wherein the geometric parameter is a slope of a line from the starting point of the resultant ionization signal and passing through the peak of the resultant ionization signal.

41. The method of claim 30 wherein the geometric parameter is an aspect ratio of a box having a lower left corner at the starting point of the resultant ionization signal, a top at the peak of the resultant ionization signal, and a right side at a percentage of the peak of the resultant ionization signal.

42. The method of claim 30 wherein the geometric parameter is a time from the start point of the ionization signal to the peak for the ionization signal.

43. The method of claim 30 wherein the geometric parameter is a calibrateable parameter for each cylinder of the lean burn reciprocating engine.

44. A method for analyzing the combustion quality in a cylinder of a lean burn reciprocating engine comprising the steps of:

determining a peak pressure location of the cylinder for successive cycles of a running engine;

receiving a succession of ionization signals of the lean burn reciprocating engine for the successive cycles;

processing a plurality of related ionization signals for signal stability;

identifying, using an initial current level for all of the signals, an ionization signal starting point of the ionization signal and a peak for the ionization signal;

associating a geometric parameter with the ionization signal which relates the ionization signal starting point to the peak for the ionization signal; comparing the geometric parameter against a reference geometric parameter related to the peak pressure location for an air/fuel ratio relating to $\lambda$ greater than 1.4; and providing an indication of combustion quality.

45. The method of claim 44 further comprising the step of adjusting a control parameter of the engine based on the indication of combustion quality such that an error difference between the geometric parameter and the reference geometric parameter is minimized.

46. The method of claim 45 wherein the geometric parameter is a crank angle degree from the start point of the ionization signal to the peak of the ionization signal and the reference geometric parameter comprises a desired crank angle degree corresponding to a desired location of a fifty percent burn rate location and the step of adjusting the control parameter of the engine such that the error difference between the geometric parameter and the reference geometric parameter is minimized comprises the step of adjusting an ignition time of the engine such that the error difference between the crank angle degree and the desired crank angle degree is minimized.

47. The method of claim 44 wherein the geometric parameter is a calibrateable parameter for each cylinder of the lean burn reciprocating engine.

48. A method for controlling the combustion quality in a cylinder of a lean burn reciprocating engine comprising the steps of:

determining a peak pressure location of the cylinder for successive cycles of a running engine for an air/fuel ratio relating to $\lambda$ greater than 1.4;

receiving a succession of ionization signals of the lean burn reciprocating engine for the successive cycles;

processing a plurality of related ionization signals for signal stability;

identifying, using an initial current level for all of the signals, a start point of the ionization signal and a peak for the ionization signal;

associating a geometric parameter with the ionization signal which relates the start point of the ionization signal to the peak for the ionization signal; comparing the geometric parameter against a reference geometric parameter related to a fifty percent burn rate point; and adjusting a control parameter of the engine such that an error difference between the geometric parameter and the reference geometric parameter is minimized.

* * * * *

UNITED STATES PATENT AND TRADEMARK OFFICE
CERTIFICATE OF CORRECTION

PATENT NO. : 6,786,200 B2
DATED : September 7, 2004
INVENTOR(S) : Viele et al.

It is certified that error appears in the above-identified patent and that said Letters Patent is hereby corrected as shown below:

<u>Title page,</u>
Item [73], Assignee, change "Woodware" to -- Woodward --.

Signed and Sealed this

Fourteenth Day of December, 2004

JON W. DUDAS
*Director of the United States Patent and Trademark Office*